Figure 7:
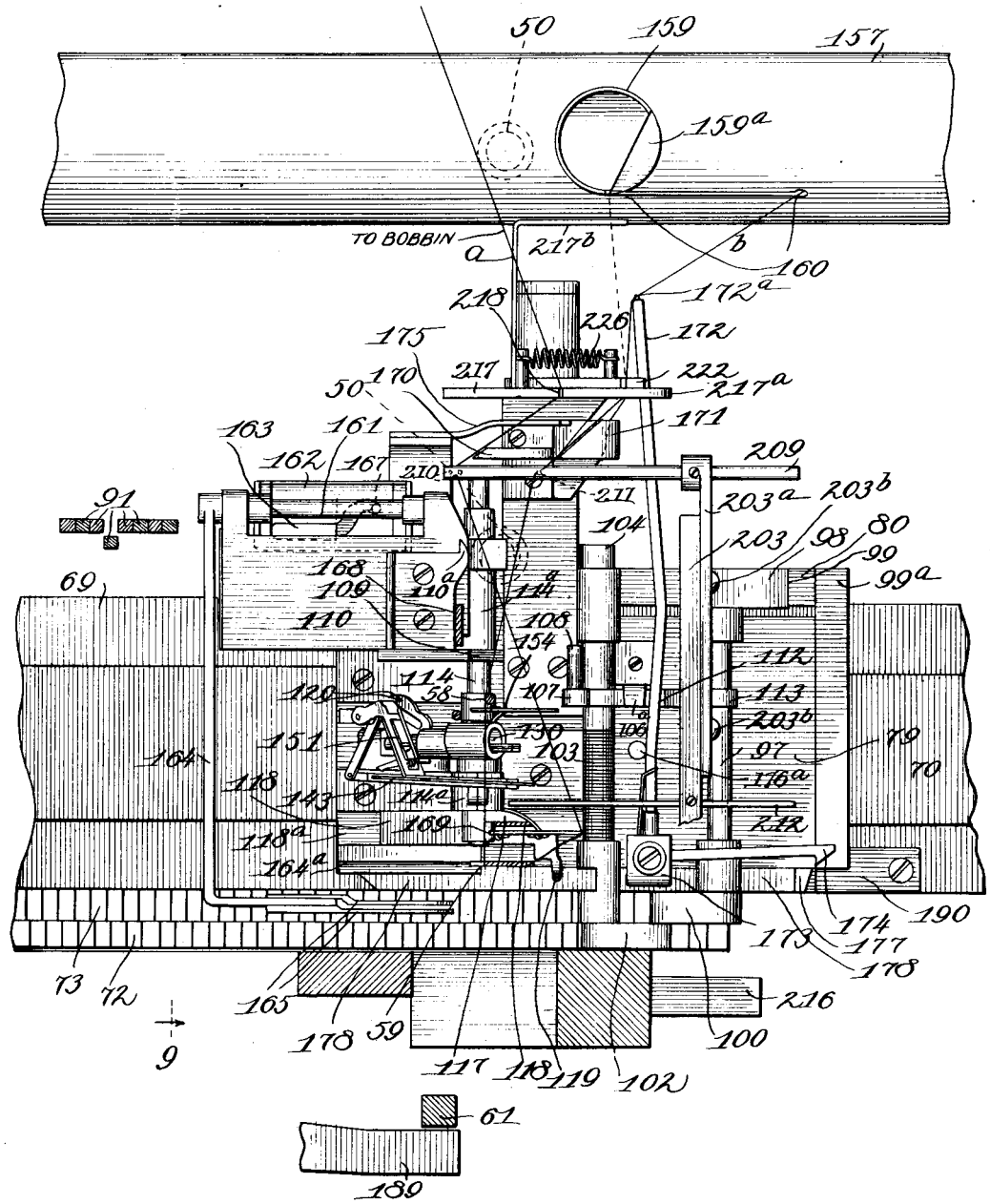

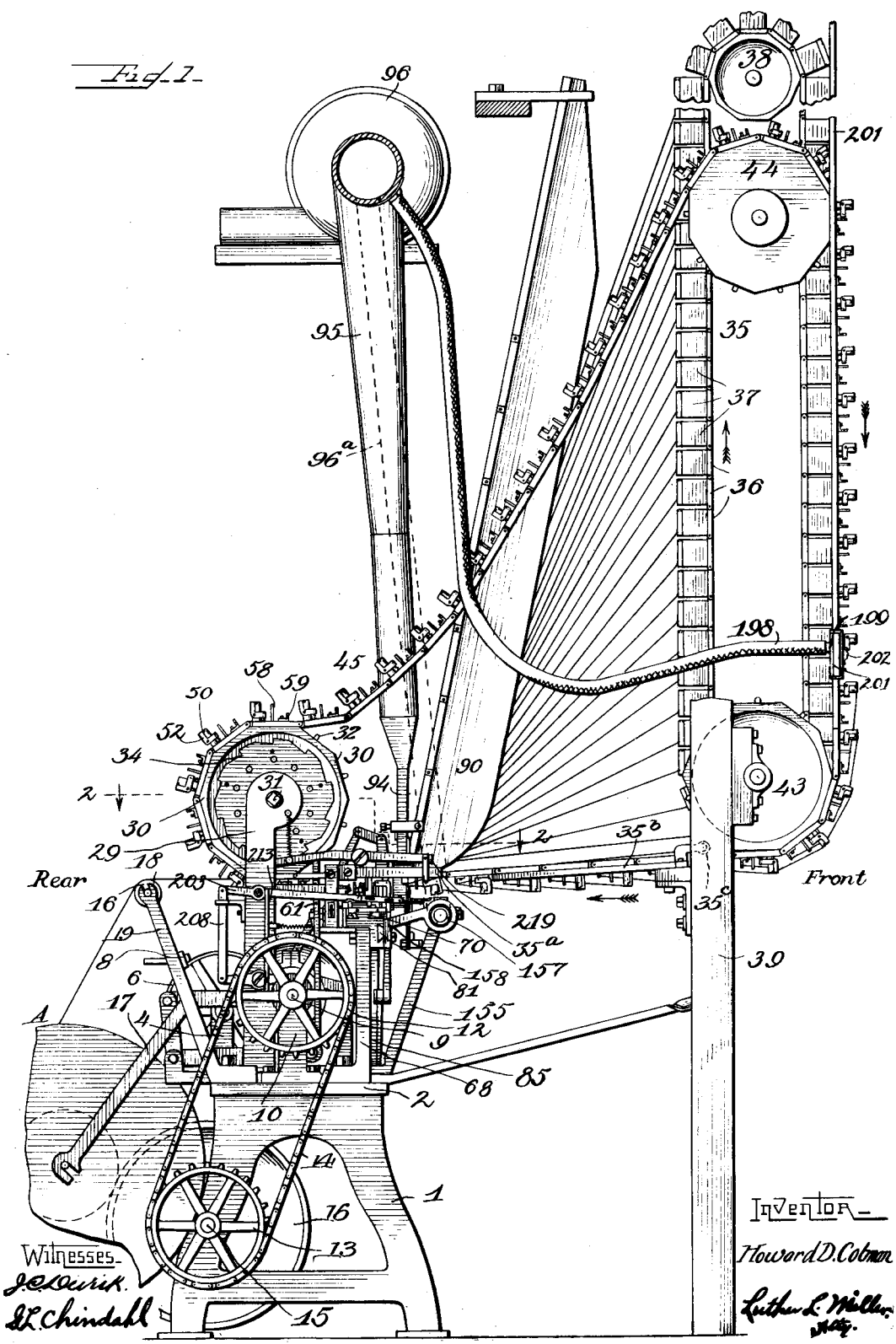

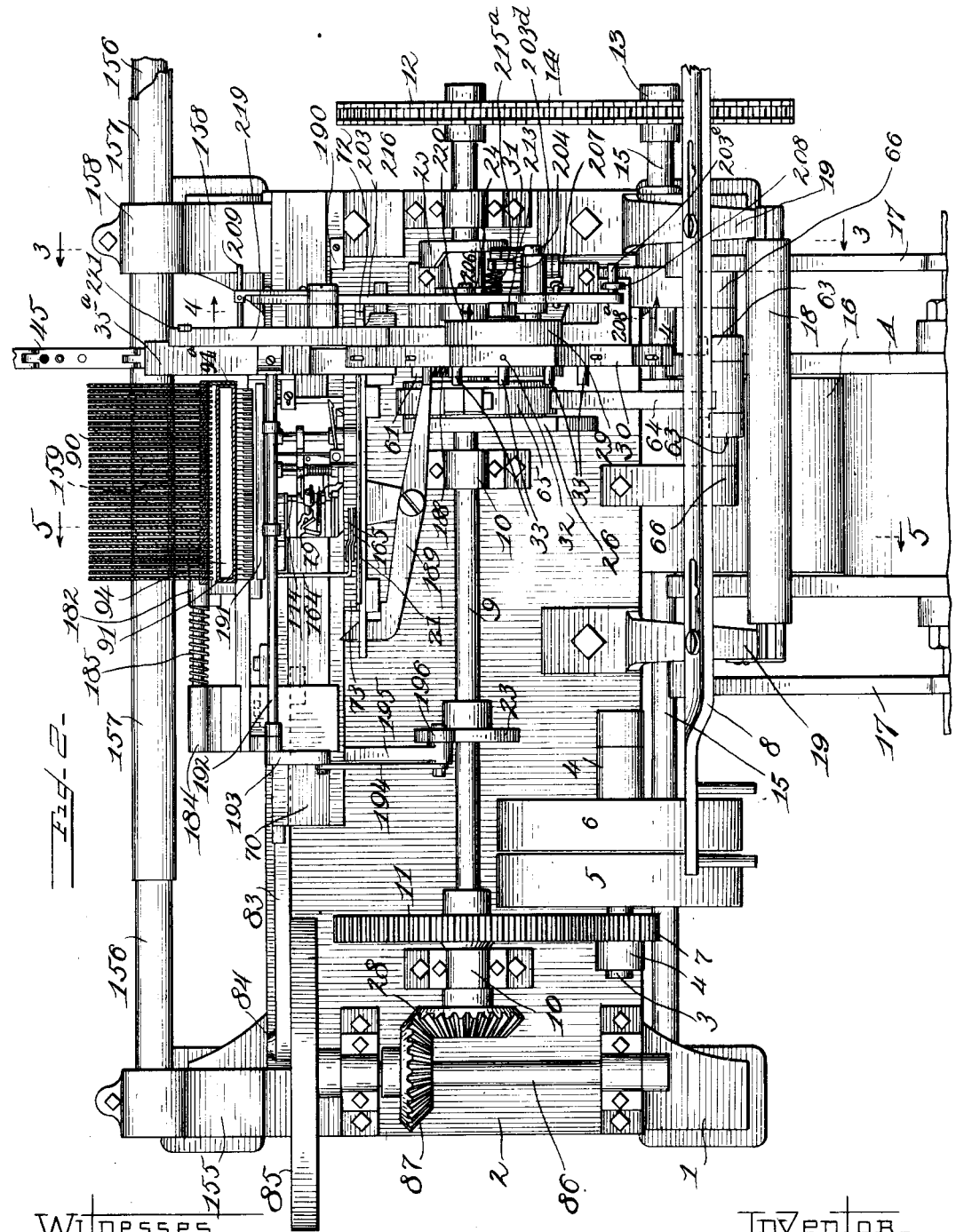

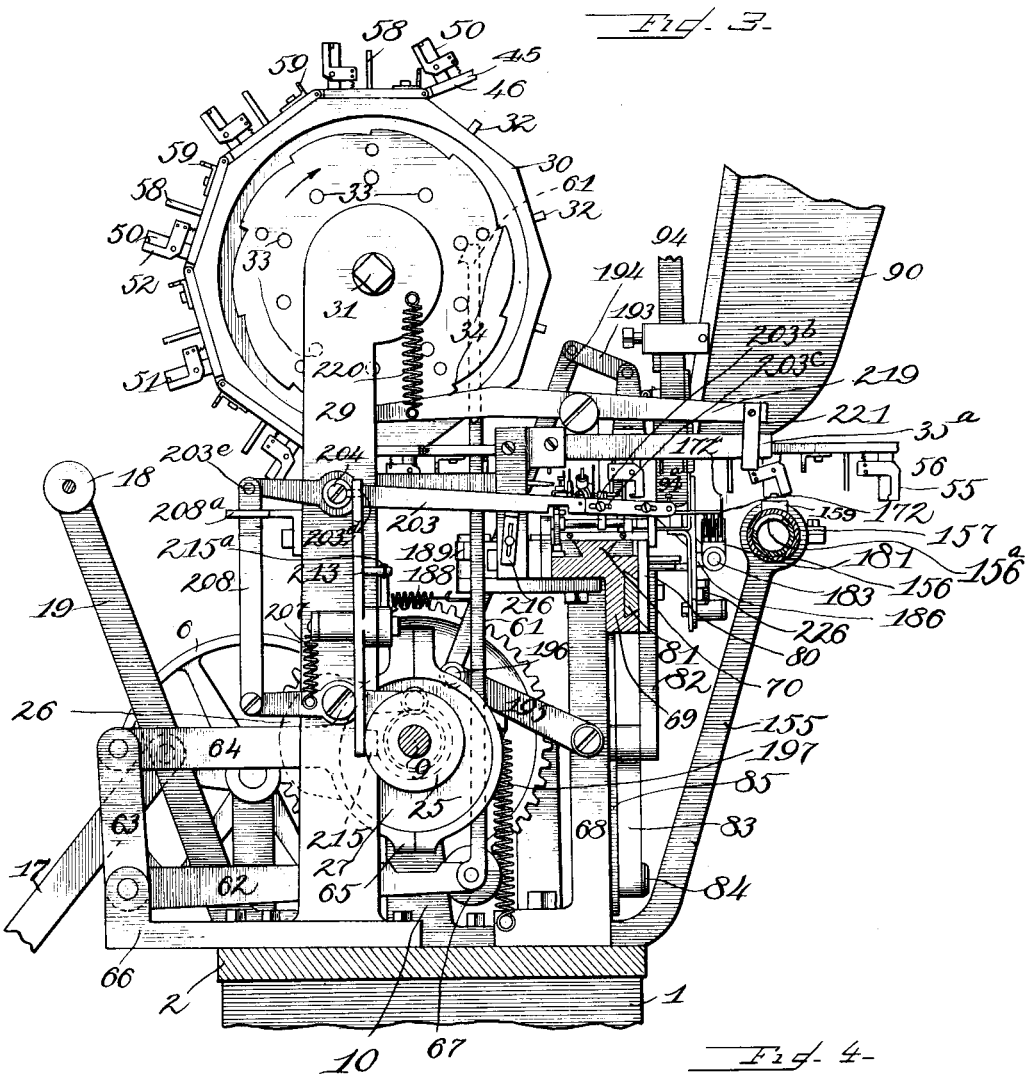

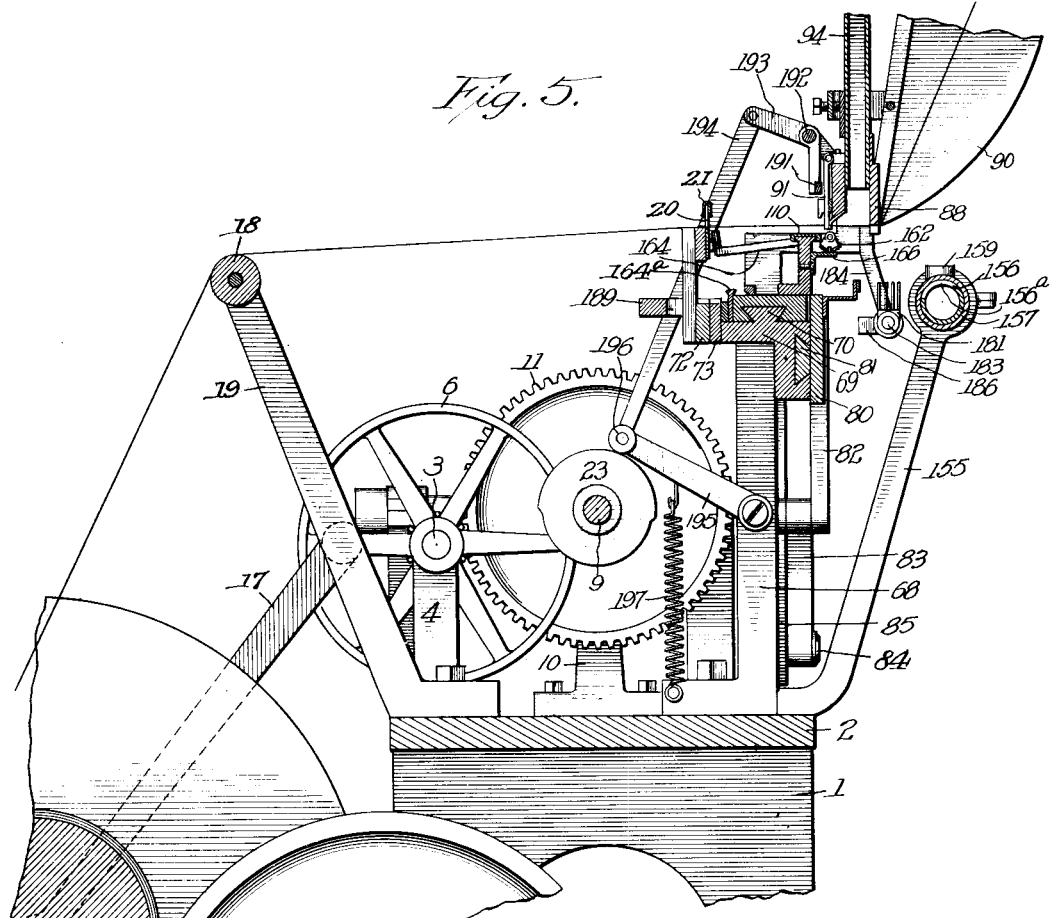
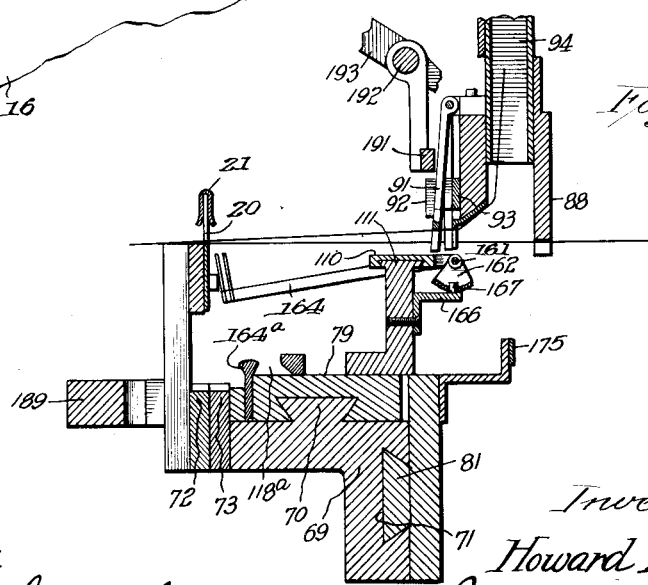

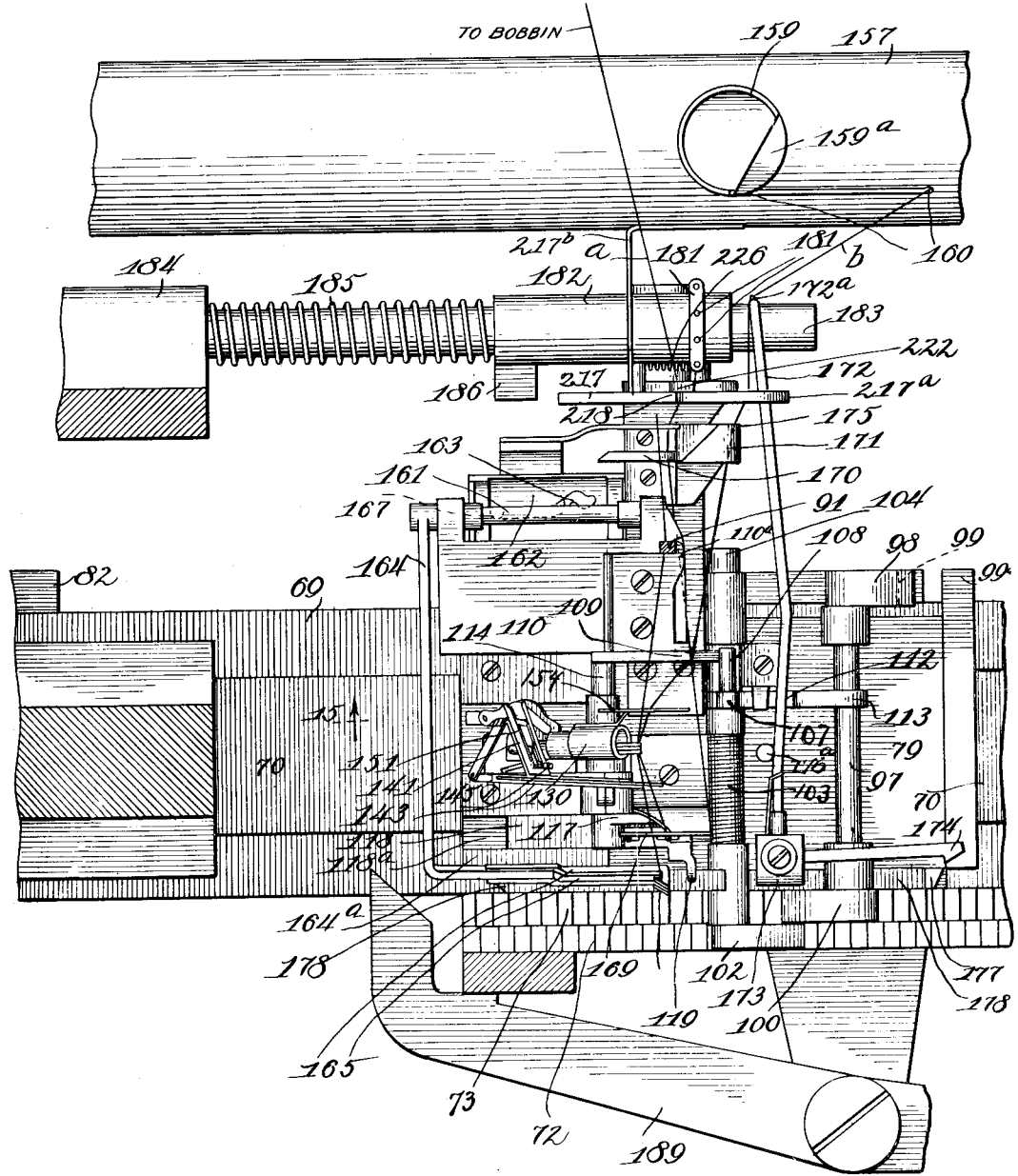

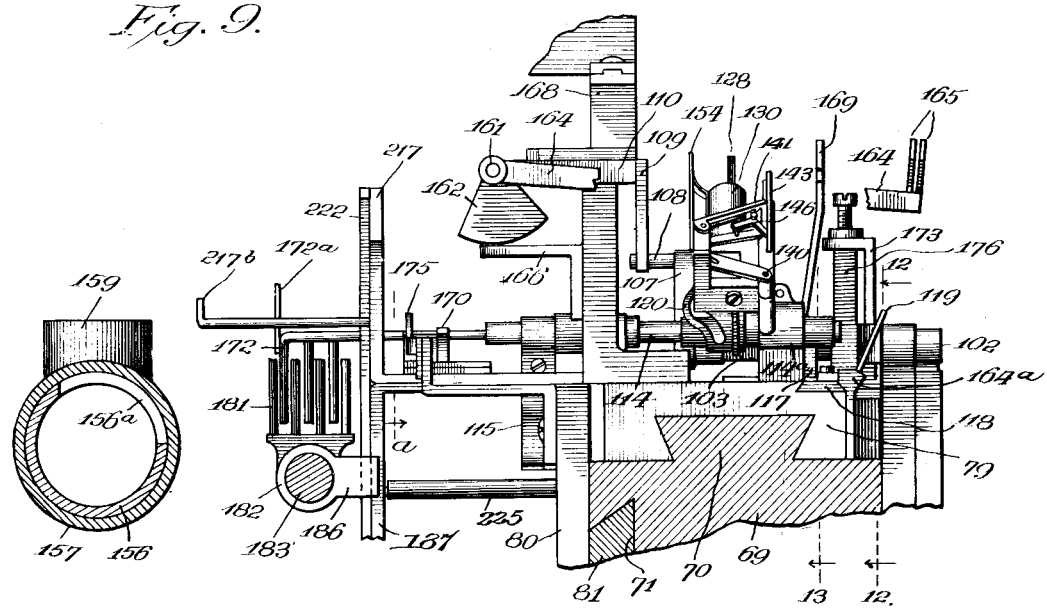

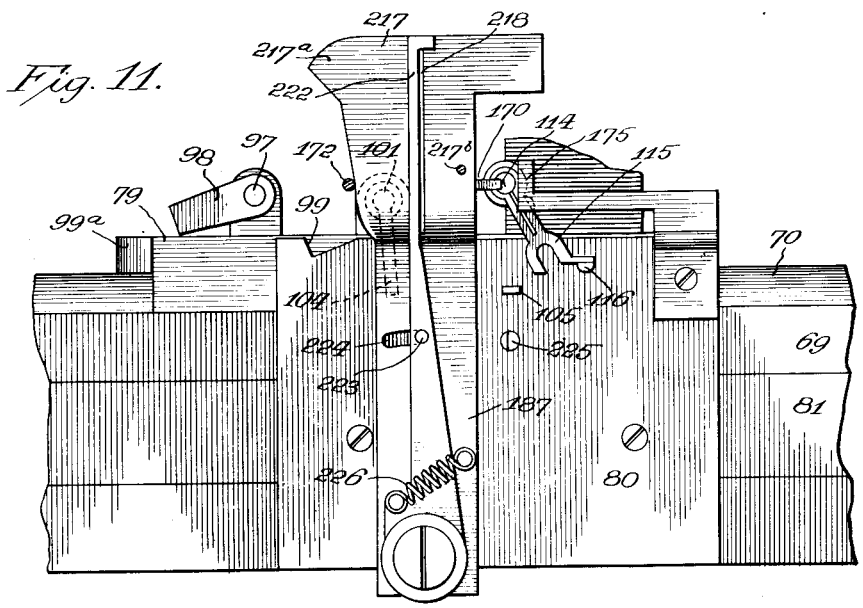

H. D. COLMAN.
WINDER.
APPLICATION FILED SEPT. 13, 1911.
1,184,077. Patented May 23, 1916.
13 SHEETS—SHEET 9.
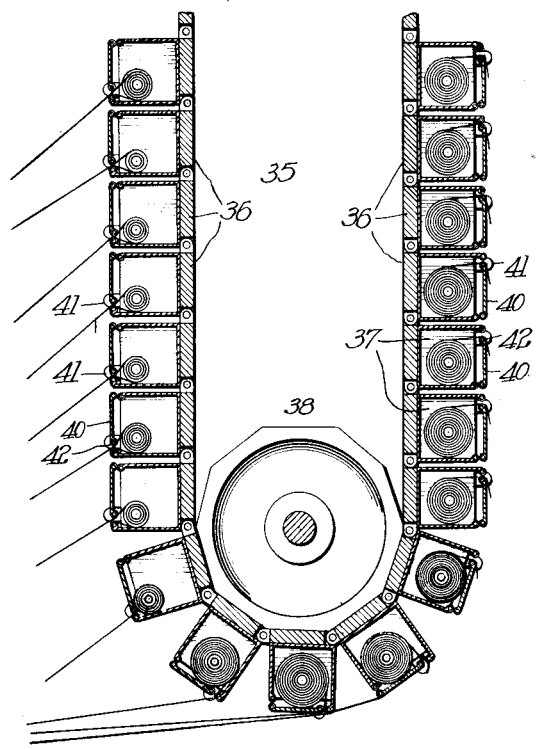
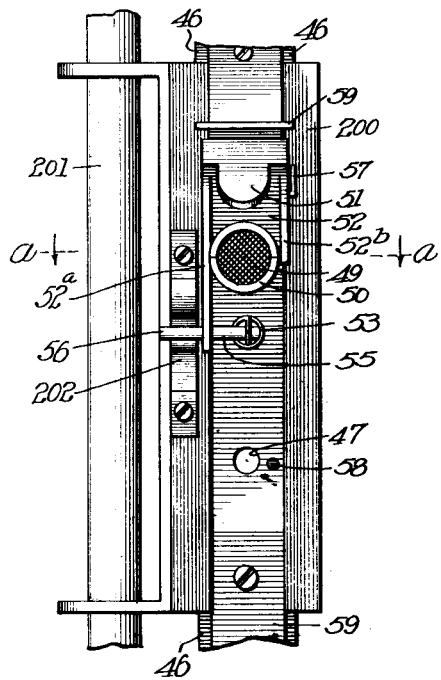
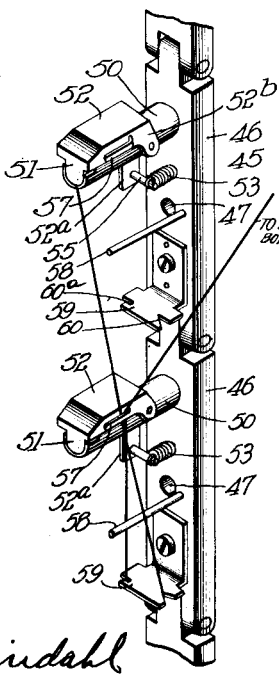
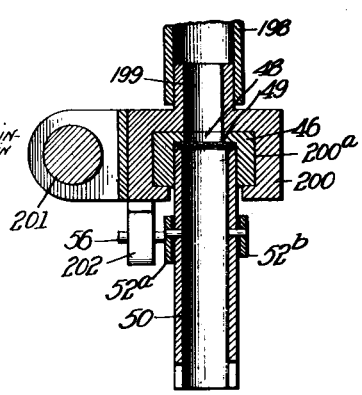
Witnesses:
J. C. Derick.
George L. Chindahl
Inventor:
Howard D. Colman
by Luther L. Miller, Atty.

H. D. COLMAN.
WINDER.
APPLICATION FILED SEPT. 13, 1911.
1,184,077.
Patented May 23, 1916.
13 SHEETS—SHEET 10.
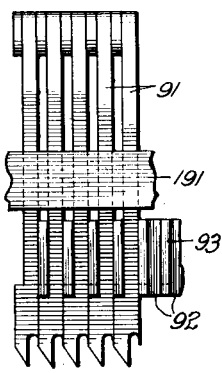
Fig. 19.
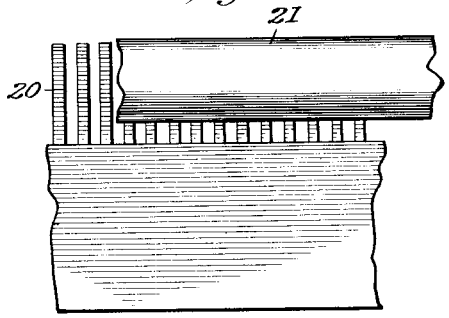
Fig. 20.
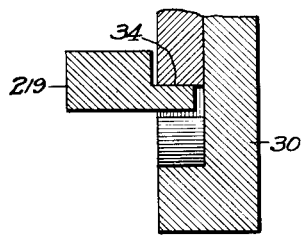
Fig. 23.
Fig. 21.
Fig. 22ᵃ.
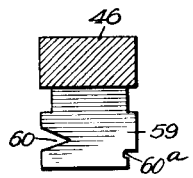
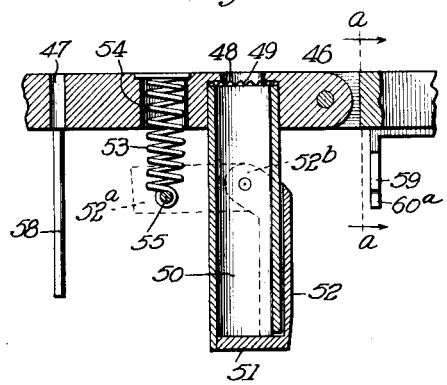
Fig. 22.
Fig. 24.
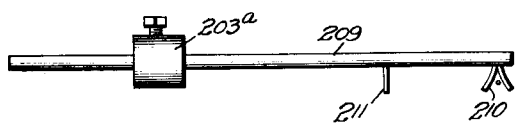
Witnesses:
J. C. Devick.
George L. Chindahl
Inventor
Howard D. Colman
by Luther L. Miller, Atty.

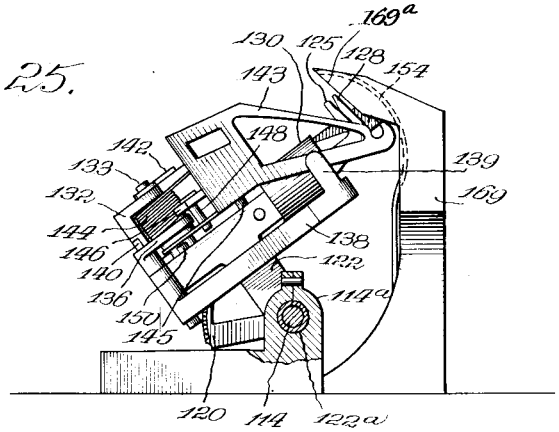
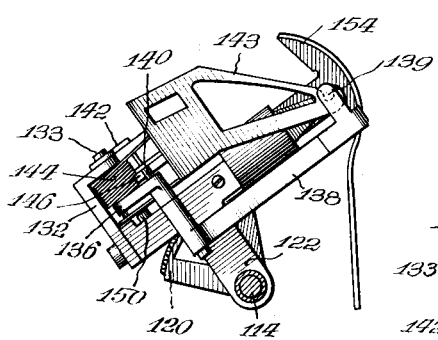
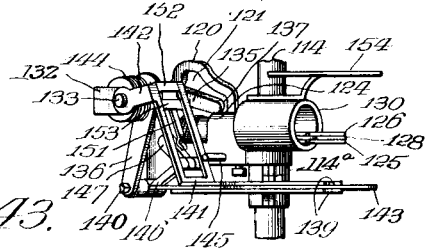
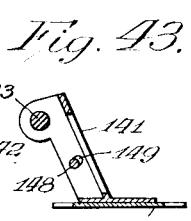
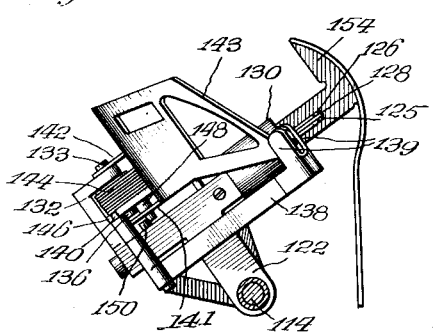
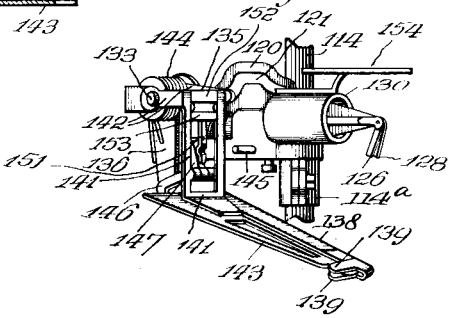

H. D. COLMAN.
WINDER.
APPLICATION FILED SEPT. 13, 1911.
1,184,077.  Patented May 23, 1916.
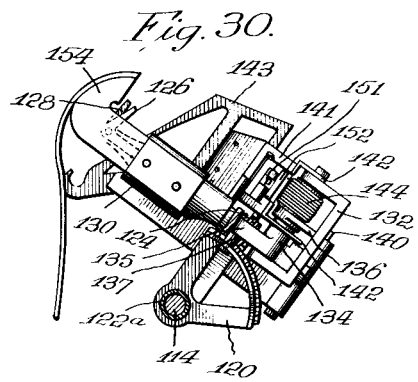
Fig. 30.
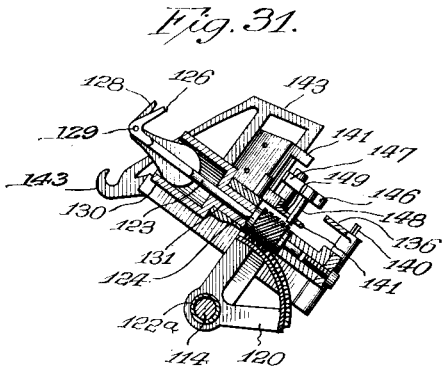
Fig. 31.
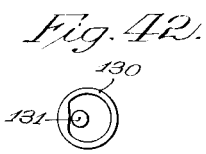
Fig. 42.
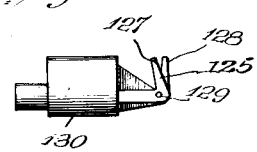
Fig. 32.
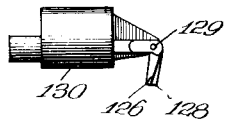
Fig. 33.
Fig. 34.
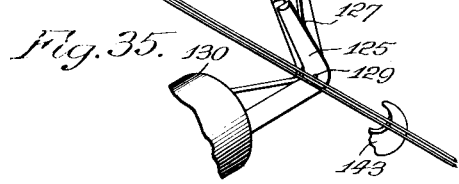
Fig. 35.
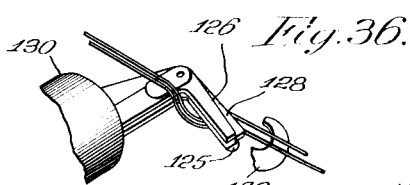
Fig. 36.
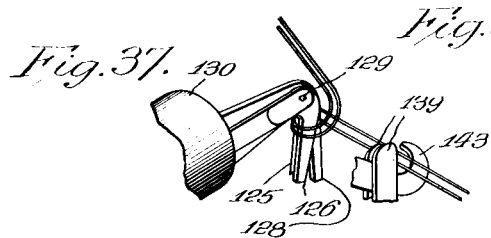
Fig. 37. Fig. 38.
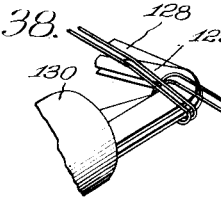
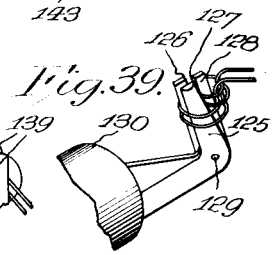
Fig. 39.
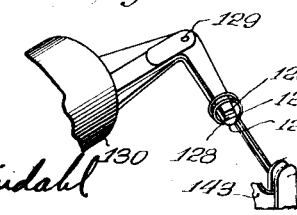
Fig. 40.
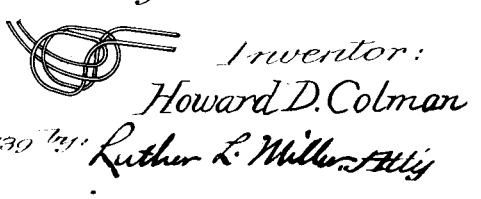
Fig. 41.
Witnesses:
J. C. Devick
George L. Chindahl
Inventor:
Howard D. Colman
by Luther L. Miller Atty

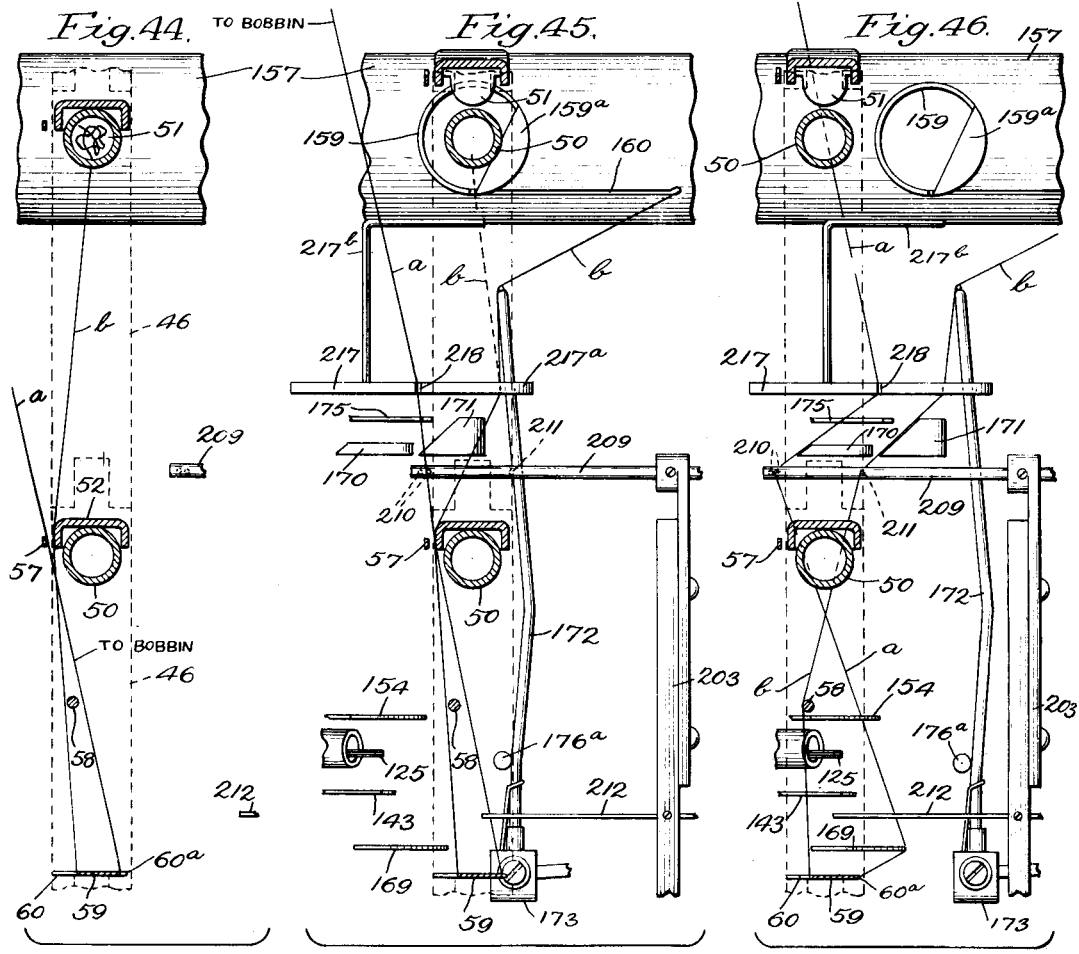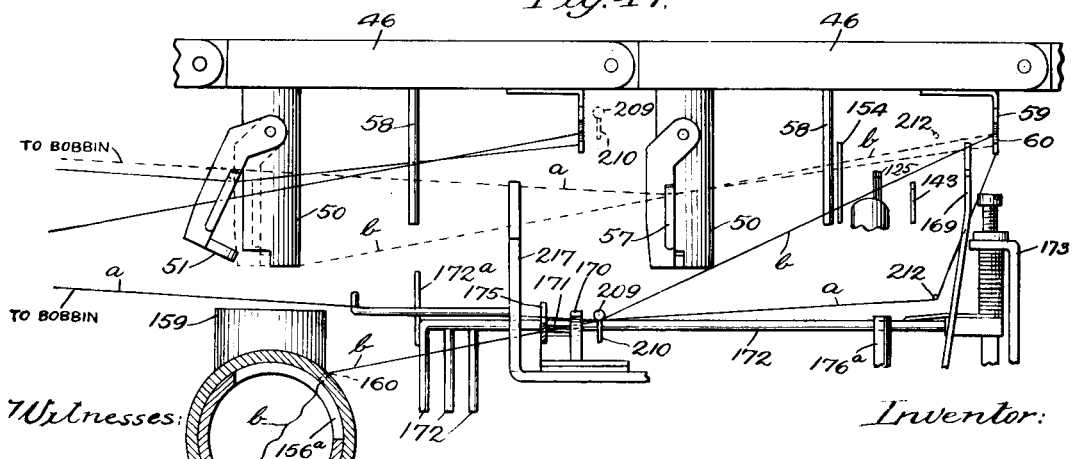

UNITED STATES PATENT OFFICE.

HOWARD D. COLMAN, OF ROCKFORD, ILLINOIS, ASSIGNOR TO HOWARD D. COLMAN, LUTHER L. MILLER, AND HARRY A. SEVERSON, COPARTNERS DOING BUSINESS AS BARBER-COLMAN COMPANY, OF ROCKFORD, ILLINOIS.

WINDER.

1,184,077.   Specification of Letters Patent.   Patented May 23, 1916.

Continuation of application Serial No. 112,705, filed June 21, 1902. This application filed September 13, 1911. Serial No. 649,080.

*To all whom it may concern:*

Be it known that I, HOWARD D. COLMAN, a citizen of the United States, residing at Rockford, in the county of Winnebago and State of Illinois, have invented certain new and useful Improvements in Winders, of which the following is a specification.

In the operation of spinning fibers into yarn, the yarn is wound upon bobbins or the like, each bobbin containing a single thread. To produce a warp it is usual to rewind the yarn from the bobbins onto spools, each spool holding a single thread of a length equivalent to the quantity of yarn upon a plurality of bobbins, the threads upon the successively unwound bobbins being tied end to end by the operatives. A sufficient number of spools are then rewound upon a section beam.

The object of this invention, generally stated, is to eliminate the spooling process, means being provided to rewind the yarn from the bobbins directly upon a section beam, and to automatically tie end to end the threads of the successively unwound bobbins.

In the accompanying drawings, Figure 1 is a side elevation of a winder embodying my invention, some of the parts of said winder being broken away. Fig. 2 is a top plan view of the central portion of said winder, the view being taken approximately in the plane of dotted line 2—2 of Fig. 1. Fig. 3 is a transverse, vertical section taken approximately in the plane of dotted line 3 3 of Fig. 2. Fig. 4 is a detail view showing in side elevation a portion of the mechanism for transferring the reserve thread from the thread chain to the knotter-carriage, the view being taken in the plane of dotted line 4—4 of Fig. 2. Fig. 5 is a transverse, vertical section upon dotted line 5 5 of Fig. 2. Fig. 6 is an enlarged view of certain of the parts shown in Fig. 5, and is taken on the same section line as Fig. 5. Fig. 7 is a top plan view of the knotter-carriage and the surrounding mechanism, showing the position of the reserve thread upon said carriage, the carriage being shown in the position assumed when a reserve thread is being transferred from the thread chain to the carriage. Fig. 8 is a similar view, showing the reserve thread and an exhausted thread laid across the tying-bill in position to be united by the tying-mechanism. Fig. 9 is a transverse, vertical section on dotted line 9 9 of Fig. 7. Fig. 9ª is a sectional view on dotted line *a* of Fig. 9, and illustrates in front elevation two hooks supported by the knotter-carriage for holding the loop of the reserve thread. Fig. 10 is a front elevation of the driving carriage, also showing the pawl for locking the driving carriage with relation to the knotter carriage. Fig. 10ª is a detail on dotted line *a a* of Fig. 10. Fig. 11 is a view of the same parts as are shown in Fig. 10, the position of said parts having been changed by the separation of the knotter-carriage and the driving carriage. Fig. 12 is a detail view of the rear edge of the knotter-carriage, showing the means for actuating the feed for the thread chain, the view being taken in the plane of dotted line 12—12 of Fig. 9. Fig. 12ª is a transverse section on dotted line *a a* of Fig. 12. Fig. 13 illustrates the slidable rack bar for supporting the knock-off finger, and the means for moving said rack bar with reference to the knotter-carriage upon which it is mounted, the view being taken in the plane of dotted line 13 of Fig. 9. Fig. 14 is a top plan view of the rack bar shown in the preceding figure, and said knock-off finger. Fig. 15 illustrates the mechanism for actuating the locking pawls, by means of which pawls the knotter-carriage is held from movement in either direction when the knot-tying mechanism is actuated, the view being taken in the plane of dotted line 15 of Fig. 8. Fig. 15ª is a transverse section on dotted line *a a* of Fig. 15. Fig. 16 is a transverse sectional view through a number of the bobbin boxes at the lower portion of the bobbin-box chain. Fig. 17 is a perspective view illustrating a section of the chain for carrying the ends of reserve threads, which threads are wound upon bobbins lying in the bobbin boxes illustrated in the last preceding figure. In Fig. 17 the position of a reserve thread upon the thread chain is shown. Fig. 18 is a fragmental elevation of the thread chain together with the means for opening the thread-holding tubes of said chain, showing one of said thread-holding tubes open to receive the loose end of a reserve thread.

Fig. 18ᵃ is a transverse section on dotted line *a a* of Fig. 18. Fig. 19 is a fragmental rear elevation of the pivoted detector-stops that are swung outward upon their pivots when the active threads break or are wholly unwound from their bobbins, in order to stop the carriage for the knot-tying mechanism, thus starting the operation that results in the tying together of the exhausted thread and the reserve thread supported upon said carriage. Fig. 20 is a fragmental view showing the guide comb for spacing the warp threads upon the section beam. Fig. 21 is a front end view of the guide sleeve for the thread chain, showing the thread-holding tube of one of the links of said chain in elevation, and illustrating the means for removing the closure from the outer end of said holding tube. Fig. 22 is a longitudinal, central section through a fragment of the thread chain, showing a thread-holding tube, the closure for the outer end of said tube, and the spring for operating said closure. Fig. 22ᵃ is a traverse section through the thread chain on dotted line *a a* of Fig. 22, showing the thread-holding bracket in elevation. Fig. 23 is a fragmental view showing in transverse section the rear end of the detent lever that engages the ratchet teeth of one of the supporting wheels for the thread chain to prevent the backward rotation of said wheel, also illustrating the manner of engagement of said detent lever with the inclined teeth of said wheel. Fig. 24 is a view in side elevation of a rod for transferring a thread from the thread chain to the carriage for the knot-tying mechanism. Fig. 25 is a side elevation of the knot-tying mechanism, the parts being in the position they are shown to occupy in the next succeeding figure. Fig. 26 is a top plan view of the knot-tying mechanism. Fig. 27 is a side elevation of the knot-tying mechanism, similar to Fig. 25 save that the elements of the thread clamp are closed together in a clamping position, and the knotter-shaft has been rotated somewhat. Fig. 28 is a top plan view of the knot-tying mechanism, showing the parts in the position which they occupy near the completion of the tying operation. Fig. 29 is a side elevation of the knot-tying mechanism, showing the parts in the positions in which they are represented in the last preceding figure. Fig. 30 is a side elevation of the knot-tying mechanism, taken from the side opposite to that shown in Figs. 25, 27 and 29. Fig. 31 is a vertical section taken on the axial line of the knotter-shaft. Figs. 32 and 33 are side elevations of the cam cylinder and the tying-bill. Fig. 34 is a top plan view of the gear-sector. Fig. 35 is a perspective view showing the tying bill in its initial position with threads in place to be acted upon by the knot-tying mechanism. Fig. 36 is a view similar to the last preceding figure, save that the tying-bill has been rotated through about one-fourth of a revolution. Fig. 37 illustrates the tying-bill after it has been rotated through one-half a revolution, also showing the thread clamp about to grasp the thread. Fig. 38 shows the tying-bill after three-quarters of a revolution, the thread clamp having clamped the thread and the shearing and clamping jaw being open to receive the thread. Fig. 39 shows the tying bill at the completion of its first revolution, the shearing and clamping jaw having clamped and severed the threads. Fig. 40 shows the tying-bill after having been rotated through about one and one-quarter to one and one-third revolutions. The thread clamp is represented in the act of stripping the thread from the point of the tying bill. Fig. 41 illustrates diagrammatically the form of knot tied by the mechanism. Fig. 42 is a front end view of the cam-cylinder of the knotter-mechanism. Fig. 43 is a detail view of the thread holding arm of said mechanism. Figs. 44, 45 and 46 are fragmental plan views illustrating different stages in the transference of a reserve thread to the knotter carriage. Fig. 47 is a view looking from the left-hand side of Fig. 46.

In the production of a winder embodying the features of my invention, I provide a supporting frame 1 having the bed-plate 2 (Figs. 2 and 3). A drive shaft 3, rotatably supported in bearings 4 above the bed-plate 2, carries the usual tight and loose pulleys 5 and 6, respectively, and the pinion 7 fixed on said drive-shaft. A belt shifter 8, of usual construction, is provided to move the belt (not shown) from the loose to the tight pulley and vice versa. A main shaft 9 is also rotatably supported in bearings 10 mounted upon the bed-plate 2, and is driven by means of a gear wheel 11 which meshes with the pinion 7. From the shaft 9 power is transmitted through sprocket wheels 12 and 13 and a chain 14 to a shaft 15. On the shaft 15 is a friction driving drum 16 that rotates the section beam A, the latter being supported on the drum 16 by means of hooked arms 17. The threads are guided to the beam by a roll 18 which is carried by fixed arms 19 extending upwardly from the bed-plate 2; also by a comb 20 (Fig. 5) having a removable cap 21. The main shaft 9 has fixed thereon cams 23, 24 and 25, a wiper cam 26, an eccentric 27, (Fig. 3) and a bevel pinion 28, all to be hereinafter more fully described.

An upright standard 29 fixed on the bed-plate 2 supports at its upper end a wheel 30 rotatably mounted on the stud 31 on said standard 29. The wheel 30 has several peripheral facets—in this instance ten—and in the middle of each facet is set a pin 32 to drive the thread chain to be hereinafter described. On one side, the wheel 30 is provided with a concentric series of pins 33 adapted to be engaged by a pawl to rotate the wheel 30, and the opposite side of the wheel has a series of teeth 34 for engaging a detent arm to be later herein described.

An endless chain 35, (Figs. 1 and 16), made up of a series of pivotally connected plates 36, each plate supporting a bobbin box 37 fixed on the face of said plate, is mounted on the pulleys 38, which said pulleys are mounted upon the frame 39. These bobbin boxes 37 are sheet-metal boxes of rectangular form, having a hinged cover 40 with a flat latch-spring 41 at one end of the box to hold the cover closed. Between the free end of the cover and the side of the box is a space 42 through which the thread upon the bobbin may be unwound. The lower one of the pulleys 38 is fixed with relation to a chain wheel 43 (Fig. 1), and at some distance above the chain wheel 43 another similar wheel 44 is rotatably mounted on the frame 39. The chain wheels 43 and 44 are similar as to their peripheral form to the chain wheel 30, and are alined therewith to receive and support the thread chain 45. This thread chain is made up of a series of pivotally connected links 46 (Fig. 17). Each link is provided with an opening 47 near its longitudinal center to receive the peripheral guide pins 32 of the wheels 30, 43 and 44 upon which the chain runs. Each link is also provided near one of its ends with an opening 48 across which extends a woven wire screen 49 (Fig. 18). The screen 49 is located at the inner end of a holding tube 50 secured in register with the opening 48. The outer end of the tube 50 is cut away to permit the operation of a closure 51 fixed on the end of an L-shape lever 52 pivotally mounted on the side of the holding tube 50 by means of the arms 52ª and 52ᵇ. This closure is held normally within the outer end of the holding tube 50 by means of a coiled spring 53 secured at one end within an opening 54 (Fig. 22) in said link 46 and connected at its outer end with the pin 55 extending from the outer end of the arm 52ª of said L-shape lever. From the opposite side of the arm 52ª extends a pin 56 arranged to be engaged by the mechanism for moving the closure 51 from the outer end of the holding tube 50 to open said tube to receive and release a thread, as will be later described herein. Upon one side the lever 52 is provided with a thread-holding hook 57. About midway in the length of each link 46 of the thread chain a pin 58 is set, and at one end and upon the outer face of each link is fixed a transverse thread-holding bracket 59 for holding a loop of a reserve thread, which bracket is provided with the notches 60 and 60ª in its opposite edges. A sleeve 35ª (Figs. 1 and 3) to support and guide the thread chain where it extends above the path of the knotter is fixed in the supporting framework of the machine, the bottom of said sleeve being longitudinally slotted to permit the passage of the tubes 50 and the other parts projecting from the links of the chain. Between the sleeve 35ª and the wheel 43, the chain is supported by a rail 35ᵇ (Fig. 1). A roller 35ᶜ prevents upward displacement of the chain.

To intermittently move the chain wheel 30 and cause the thread chain to be fed forward one link at a time, I provide a vertically reciprocating pawl 61, Fig. 3, the hooked upper end of which is adapted to engage one of the pins 33 on the side of the wheel 30 and to rotate said wheel through the downward movement of the pawl. The lower end of the pawl 61 has a pivotal engagement with one arm 62 of a bell-crank lever, the other arm 63 of which bell-crank lever is pivotally connected with the rod 64 and yoke 65 of the eccentric 27 on the main shaft 9. This bell-crank lever is pivotally mounted in bearings 66 on the bed-plate 2. The wiper cam 26 coöperates with said bell-crank lever in moving the pawl 61, the bearing periphery of said cam being adapted to contact the roller 67 pivotally mounted at the side of the arm 62 of the bell-crank lever and near the forward end of said arm. On account of some degree of springiness in the bell-crank lever 62—63, the cam 26 is provided to effect complete movement of the thread chain.

Two arms 68 (Figs. 3 and 5) are secured to the bed-plate 2 near one edge thereof, and extend upwardly therefrom, and at their upper ends are connected by the guide-bar 69 having the raised dovetail guide 70 on its upper face and the dovetail guide-groove 71 (Fig. 6) in its forward side. At the rear edge of the guide bar 69 are fixed two racks 72 and 73 (Figs. 2, 6 and 7) having inclined teeth facing in opposite directions in the different racks.

Two carriages, to wit, the knotter-carriage 79 and the drive carriage 80, (Figs. 6 to 10) are adapted to be reciprocated upon the guide bar 69, the carriage 79 running upon the raised dovetail guide 70 and the carriage 80 being fixed to a slide bar 81 of dovetail form in cross-section, lying within the guide-groove 71. To the slide bar 81 is fixed an arm 82 (Fig. 3) which is connected by means of a connecting rod 83 with a wrist-pin 84 on the face-plate 85, which face-plate is fixed on the end of the shaft 86 extending transversely of the bed-plate 2 and receiving rotatory motion from the main shaft 9 (Fig. 2) through the bevel pinion 87 meshing with the similar pinion 28. A spacing comb 88, (Fig. 5) open at its lower edge, extends longitudinally of and above the guide-bar 69 and is rigidly secured in place in the framework of the machine. Partitions 90 (Figs. 1 and 5) extend forward and upward from the comb 88, their purpose being to separate the threads coming from the bobbins in the bobbin boxes and passing through the comb. Slightly rearward of the comb 88, and pivotally suspended in the machine frame are the detector-stops 91 (Figs. 6, 7 and 19) adapted to lie in the vertical grooves 92 of the fixed keeper bar 93 and notched in their lower ends to correspond with the spaces in said comb 88. An air funnel 94 (Fig. 6) connected by means of the pipe 95 (Fig. 1) with an exhaust fan 96 lies with its open mouth between the comb 88 and the pivoted detector-stops, the purpose being to induce a strong current of air upward between the comb and the stops so that when the tension of any one of the threads passing through the comb is reduced through the exhaustion of the thread the loose end portion will be drawn upward into the air funnel (Fig. 6) and into engagement with the lower end of its corresponding detector-stop, the pull of the thread upon said stop as the winding continues swinging the stop rearward upon its pivot. When the threads pass regularly through the comb the tension upon each thread is sufficient to overcome the tendency of the air current to draw the threads or any of them into the air funnel, but when a thread breaks at a point between the detector stops 91 and the bobbin boxes 37 or becomes exhausted and the tension is thus relieved, the loose end is immediately drawn upward into the funnel as just explained.

The carriages 79 and 80 normally move together to and fro upon the guide bar 69. The movement of the carriages away from the thread chain will be termed the outward movement, and the movement in the opposite direction will be called the return movement. The tying operations occur during the outward movements of the carriages. An oscillatory locking shaft 97 (Figs. 7 and 10) is journaled upon and extends transversely of the carriage 79, and at its forward end said shaft carries a pawl 98 fixed thereon and adapted to engage a tooth 99 on the drive carriage 80 to hold said tooth against a projection 99ª rigid with the knotter-carriage, thereby locking the two carriages together during their normal reciprocatory movement. The rear end of the oscillatory shaft 97 carries the pawl 100 (Fig. 7) also fixed on said shaft, said pawl 100 being adapted to engage the teeth of the rack 73. An oscillatory shaft 101 (Fig. 11) extending parallel with the shaft 97, is mounted upon the knotter-carriage 79. The shaft 101 has fixed thereon a pawl 102 (Figs. 7 and 8) adapted to engage with the teeth of the rack 72, said pawl being arranged to be held in engagement with said rack by the coiled spring 103 surrounding said shaft. To the forward end of the oscillatory shaft 101 is fixed a trigger arm 104 (Figs. 8, 10, 11 and 15) adapted to be engaged by a stud 105 extending from the side of the drive carriage 80, by means of which stud the pawl 102 is held out of engagement with the teeth of the rack 72 against the action of the coiled spring 103 when the carriages 79 and 80 are locked together. The shaft 101 also carries the bell-crank lever 106 (Fig. 15) loosely mounted upon said shaft, the upwardly extending arm 107 (Figs. 15, 7 and 8) of said bell-crank lever having a fixed pin 108 adapted to be engaged by a foot 109 extending downward from a slide plate 110 (Figs. 7, 8, and 9) movable upon the guide 111 (Fig. 15ª) with relation to the knotter-carriage 79. Pivotal movement of the bell-crank lever 106 in one direction is limited by contact of the arm 112 (Fig. 15) of said bell-crank lever with an overhanging stop 106ª. The arm 112 overlies a similar arm 113 fixed on the oscillatory shaft 97, and is adapted to rock said shaft 97 to throw the pawl 100 into engagement with the teeth of the rack 73 and to raise the pawl 98 from engagement with the tooth 99 of the drive carriage 80 in order to separate the two carriages 79 and 80 to permit the latter to move with relation to the former. When the carriages separate, the stud 105 is withdrawn from engagement with the trigger arm 104, whereupon the shaft 101 is immediately rocked by its spring 103 to throw the pawl 102 into engagement with the rack 72. A projection 110ª (Figs. 7 and 8) fixed upon the slide plate 110 extends into position to be engaged by any one of the detector-stops 91 when such stop is swung upon its pivot by an exhausted thread. The relative movement between the slide plate 110 and the carriage 79 causes the separation of said carriage from the drive carriage 80 and locks the former carriage from movement, as just described.

A knotter-actuating shaft 114 (Figs. 7 to 11, 13 and 25) mounted in bearings 114ª upon the knotter carriage 79 and extending parallel with the shaft 101, has a fork 115 fixed on its forward end, which fork is adapted to be engaged by a stud 116 on the drive carriage when said carriage is moved with relation to the knotter-carriage 79. The partial rotation of the knotter-actuating shaft 114 caused by the engagement of the stud 116 with the fork 115 during the separation of the knotter-carriage and the drive carriage actuates the knot-tying mechanism. At its rear end the knotter-actuating shaft 114 has a gear-sector 117 (Figs. 7, 8, and 13) fixed thereon, which sector meshes with the teeth of a rack bar 118 slidably mounted in a guideway 118ª, said rack bar carrying a knock-off finger 119 (Figs. 9 and 14) the purpose of which finger will appear hereinafter. Intermediate its ends the knotter-actuating shaft 114 carries a gear-segment 120 (Figs. 25 and 34) having a cam-groove 121 somewhat of the form of the letter U with its arms widespread and extended outwardly a little distance at their ends.

As hereinbefore explained, the separation of the knotter-carriage 79 and the drive carriage 80 causes the former to be locked upon its guide 70 and the knot-tying mechanism carried by said carriage to be actuated. Upon the return movement of the drive carriage 80 the stud 116 engages and rocks the fork 115 and with it the knotter-actuating shaft 114, restoring the knot-tying mechanism to its initial position, the engagement of the stud 105 with the trigger arm 104 during such return movement of the driving carriage raising the pawl 102 from engagement with the rack 72. When the driving carriage 80 engages the projection 99ª the knotter carriage 79 is moved, the pawl 100 being disengaged from the rack 73 by such movement of the knotter carriage and the pawl 98 consequently moved behind the tooth 99.

The knot-tying mechanism proper is supported on a bracket 122 (Fig. 25) having an integral sleeve 122ª adapted to lie within one of the bearings 114ª (Figs. 7 and 13), of the knotter-carriage 79 and to be held from movement therein by a pinch-fit or in any other suitable manner. The knotter-actuating shaft 114 at its rear end has a bearing in said sleeve. A knotter-shaft 123 (Fig. 31) is rotatably mounted in the upper end of the bracket 122, said shaft having a skew-pinion 124 fixed thereon, the teeth of which pinion are adapted to mesh with the teeth of the segment 120, which latter teeth are also skewed. The forward end of this shaft is bent substantially at a right angle with the body of the shaft, to form the tying-bill 125. This tying-bill tapers toward its end, and is bifurcated to provide on one side a shear-edge 126 and on the other side a clamping edge 127. A shearing and clamping jaw 128, substantially of L-form and having a shearing edge and a clamping edge to correspond with the similar shearing edge and clamping edge of the tying-bill, is pivotally mounted upon the pin 129 within the bifurcation in the tying-bill 125. A cam-barrel 130 (Fig. 42), the interior conformation of which is somewhat of heart-shape in cross-section, is fixed on the bracket 122, the knotter-shaft passing through an opening 131 eccentric to the outer cylindrical curvature of the cam-barrel. The rear end of the L-shape shearing and clamping jaw 128 (Fig. 31) is widened and lies within the cam-barrel 130, said jaw being opened and closed in the rotation of the tying-bill.

At one of its ends the bracket 122 carries a fixed bracket 132 (Fig. 27). A pintle 133 extends longitudinally through said bracket 132, and a hub 134 (Fig. 30) having two bell-crank arms 135 and 136 is mounted loosely on said pintle. One of said arms (135) carries an antifriction roller 137 that lies within the cam-groove 121 of the gear segment 120. The other (136) of said arms carries the thread-clamping arm 138 (Fig. 27) having at its forward end the two upwardly extending spring clamping fingers 139. The thread-clamping arm is connected with the outer end of the arm 136 by means of the pivot pin 140 passing through one end of said clamping arm and the outer end of the arm 136, and the upwardly projecting end of this pin is made angular in form (Fig. 26) for a purpose to be later specified. A movement of the gear-segment 120 oscillates the hub 134 upon its pintle 133.

A thread-holding arm 141 (Figs. 28 and 43) is loosely mounted by means of its integral ears 142 on the hub 134 and pintle 133 and has its outer portion 143 formed at an angle with the plane of its body portion. The forward end of the outer portion 143 of said thread-holding arm is substantially in hook form to receive the thread when the same is laid across the tying-bill by mechanism to be hereinafter described. It extends forwardly between the spring clamping fingers 139, which clamping fingers are moved during the operation of the mechanism to clamp the threads between said clamping fingers and the hook of the thread-holding arm.

A spring 144 coiled about the hub 134 is attached at one end to the arm 136 and at the other end to the thread-holding arm 141, and by its elasticity tends to hold said arms 136 and 141 apart. A stop-pin 145 fixed upon the bracket 122 limits the forward movement of the thread-holding arm 141. A spring latch 146 (Figs. 26 and 27) is pivotally mounted upon the thread-holding arm 141, which latch is adapted to engage the angular upper end of the pin 140, by which engagement the thread-holding arm 141 and the bell-crank arm 136 are locked together. The integral arm 147 of the latch 146 also has a downwardly extending trigger-pin 148 (Fig. 31) which projects through an opening 149 (Fig. 43) in the arm 141 and is adapted to engage the delay-stud 150 on the bracket 122. The delay-stud 150 limits the rearward movement of the arm 141 through the medium of the trigger-pin 148. The integral arm 147 of the latch 146 is adapted to be engaged by a flat spring 151 (Fig. 28) to hold the latch 146 in a position to engage said angular pin 140 said spring normally holding the pin 148 against one end wall of the opening 149. The form of the spring 151 is such that it is held in position without extraneous securing means. The body portion of said spring is bent over upon itself, forming a spring clamp 152 by means of which the spring is firmly held upon one end of the arm 141, the ears 153 preventing vertical displacement of the spring. On the opposite side of the cam-barrel 130 from the thread-holding arm 141 is a thread-guide 154, (Figs. 7, 8 and 27), fixed to said cam-barrel in any suitable manner. When the reserve thread and the exhausted thread are placed upon the knotter-carriage, the guide 154 holds said threads in proper position with relation to the tying-bill. The end of the reserve thread and the end of the exhausted thread to be joined together having been placed upon the knotter-carriage by mechanism to be hereinafter described, the operation of the knot-tying mechanism is as follows: The portions of the two ends lying side by side, extend across the knotter-shaft 123 directly under the point of the tying-bill 125 (see Figs. 8 and 35), said threads also extending across the outer end 143 of the thread-holding arm 141. A movement of the knotter-carriage 79 with relation to the drive carriage causes the fork 115 on the knotter-actuating shaft 114 to be engaged by the stud 116 on the drive carriage, oscillating said shaft 114 and, through the gear-segment 120 and the pinion 124, rotating the knotter-shaft 123, the rotating tying-bill forming a loop in the threads to be united. The movement just mentioned of the gear segment 120 also causes the clamping fingers 139 of the thread-clamping arm 138 to move forward on the thread-holding arm 141 and to clamp said threads within the hooked forward end of said thread-holding arm, the arms 138 and 141 at the same time becoming locked together by means of the spring latch 146 and the pin 140. The clamping of the thread, however, is not done until the tying-bill has taken up sufficient slack to form the knot. Continuing rotation of the knotter-shaft 123 opens the shearing and clamping jaw 128 (as in Figs. 37 and 38) to receive the ends of the threads passing over the tying-bill to the thread-guide 154. Continued rotation of the knotter-shaft closes said shearing and clamping jaw to shear and clamp the ends of the threads. During the continuing rotation of the knotter-shaft the thread-holding arm 141, with the threads clamped within the hook at the forward end of said arm, swings outward upon its pivotal support, taking up the slack in the threads that is presented as the tying-bill turns toward the thread-holding arm, and, as the knot is drawn off said bill by the arm 141, said arm tightens the knot and pulls the short ends of the knot from the clamping jaws of the bill. At about this time the trigger-pin 148 of the spring latch 146 is brought into contact with the delay-stud 150, said latch is rocked upon its pivot against the action of the spring 151, and the engagement between the thread-holding arm 141 and the bell-crank arm 136 is broken. The spring 144 thereupon immediately separates the thread-holding arm from the bell-crank arm, said thread-holding arm being thrown forward to its normal position (Fig. 8) against the stop pin 145 whereby the threads are released from the thread-holding arm. After being sheared by the tying-bill, as hereinbefore described, the waste end of the exhausted thread is drawn upward into the air funnel 94 and the waste end of the reserve thread is drawn into a suction tube to be next described.

An arm 155 (Figs. 1, 2 and 3) fixed at its lower end to the bed-plate 2 at the front edge thereof and extending upwardly from said bed-plate, carries at its upper end a fixed guide tube 156. Intermediate its ends and in its upper side this guide tube is slotted, as at 156ᵃ (Fig. 9) and said tube is surrounded by the slidable air tube 157, which latter tube is supported upon a bracket 158 fixed upon and movable with the slide bar 81 for the drive carriage. The fixed air tube 156 may be arranged to communicate at one end with the exhaust fan 96 in any suitable way as by means of a tube 96ᵃ indicated in dotted lines in Fig. 1. The slidable air tube 157 has an upwardly-extending tubular stem 159 (Figs. 2, 3, and 9) on its upper side, which stem is provided with a slot 160 in its side toward the thread-joining mechanism, said slot extending downward and thence longitudinally in the walls of the air tube 157 and communicating with the slot 156ᵃ in the fixed air tube 156. The tubular stem 159 is provided in its upper end with a wall 159ᵃ which acts as a guide to direct the loose end of a reserve thread into the slot 160 when such thread is being transferred from the thread-chain 45 to the knotter-carriage 79.

At the forward edge of the slide plate 110 an oscillatory shaft 161 (Figs. 7 and 9) is mounted, and fixed upon said shaft is a cradle cam 162 having a cam-groove 163 in its peripheral face. The shaft 161 also carries a rearwardly-extending arm 164 fixed at one end of said shaft, the outer end of which arm is bent at a right angle to the body portion thereof and extends parallel with the comb 20, said outer end resting during the tying operation upon a rail 164ᵃ (Figs. 6 to 9) fixed with relation to the knotter-carriage 79. Normally, however, the arm 164 occupies the position shown in Fig. 5. At its outer end the arm 164 is provided with two barbed hooks 165 secured to opposite sides of said arm, in order to leave a space between said hooks for the passage of the knock-off finger 119 mounted upon the slidable rack bar 118. A bracket 166 (Figs. 6, 9 and 10) fixed with relation to the knotter-carriage 79 carries a roller stud 167 adapted to lie within the cam-groove 163 in the peripheral face of the cradle cam 162. When the slide plate 110 moving with the knotter-carriage 79 is engaged by one of the detector stops 91 (Fig. 8), the movement of the carriage continues for a little distance which relative movement between the slide plate 110 and the carriage 79 causes the drive carriage to be separated from the knotter-carriage and the latter to be locked in position on its guide beneath the exhausted thread. Before the knotter-carriage 79 comes to rest, the roller stud 167 on said carriage travels the length of the cam-groove 163 in the cradle cam 162. The form of the cam-groove 163 is such that the arm 164 is first raised to permit its hooks 165 to engage the exhausted thread and then lowered to draw said thread downward beside the reserve thread that lies across the knotter-shaft just under the point of the tying-bill. The exhausted thread is released from the hooks of the arm 164 by the knock-off finger 119 which is moved between said hooks when the rotation of the tying-bill begins by reason of its gear connection (Fig. 13) with the knotter-actuating shaft 114. The disengagement of the exhausted thread from the hooks 165 provides thread for the winding mechanism while the knot is being tied, so that the winding shall not be interrupted. The ends of the exhausted thread and the reserve thread that lie within the air tubes 94 and 156 remain within said tubes until the waste ends are severed. When said ends are severed by the knot-tying mechanism the waste end of the exhausted thread is drawn by the air current upward through the air funnel 94 and removed, and the waste end of the reserve thread is drawn in a similar manner into the air tube 157 through the slot 160 therein. An adjustable stop 168 (Figs. 7 and 9) supported in the machine frame automatically restores the slide plate 110 and the arm 164 to their normal positions upon the return movement of the carriage.

The end of a reserve thread is normally carried upon the knotter-carriage 79 in position to be tied to any exhausted thread. Said reserve thread, as it comes from its bobbin, extends beneath a hook 170 and is looped over a hook 169 both fixed on the carriage 79, (see Figs. 9, 9ª and 25), the free end of the thread running under a hook 171 upon said carriage to the slot 160 in the sliding air tube 157. A hook 175 (Figs. 7, 8, 9, 9ª and 11) secured to the drive carriage is arranged to draw the reserve thread out of the hook 170 when the drive carriage and the knotter carriage separate. Intermediate the hook 171 and the slot 160, the reserve thread passes across the tines of a thread-fork 172 (Figs. 7, 8 and 9) pivotally supported upon the knotter-carriage 79 in the bracket 173 and having a hooked arm 174 extending at right angles to the stem of said fork. A pin 172ª (Fig. 9) fixed rigidly to and extending upwardly from said fork is intended to prevent the thread from getting at the wrong side of the fork 172 while the thread is being transferred from the tube 50 to the slot 160. A spring 176 (Fig. 9) surrounding the pivot for the fork 172 normally holds said fork against a stop pin 176ª (Fig. 7). The hooked arm 174 is adapted to engage a stud 177 (Figs. 8 and 12) on a plate 178 mounted upon the rear side of the knotter-carriage 79 and having a sliding connection therewith by means of the elongated openings 179 and shoulder screws 180 extending therethrough. Near the outer end of the path of movement of the carriages 79 and 80 is a thread fork 181 (Figs. 8 and 9) mounted upon a sleeve 182 which is slidably supported upon a rod 183 fixed in an arm 184 of the machine frame. The fork 181 is yieldingly held in the path of movement of the thread fork 172 by a coiled spring 185. The fork 181 and its supporting sleeve 182 are slidably mounted so that said fork may be moved against the action of said spring 185 by the reciprocating knotter carriage 79, a stud 186 on said sleeve being adapted to be engaged by a plate 187 (Fig. 9) fixed to said carriage. The fork 181 is held forward by the spring 185 so that said fork shall be in position to engage a reserve thread extending across the tines of the fork 172 (Figs. 8 and 9) and at the same time be yielding to the movement of the carriage in its travel. When no reserve thread lies across the fork 172, the fingers of said fork pass freely between the corresponding fingers of the similar fork 181, but when a reserve thread lies upon the knotter-carriage, passing over said fork 172, and the two forks 172 and 181 are brought together by the movement of the mechanism, the fork 172 is prevented by the tension upon said thread from passing the fork 181, the fork arm 172 is rocked upon its pivot, and its hooked arm 174 is moved into position to engage the angular stud 177, thereby preventing the feed for the thread chain from operating as described later. If for any reason the thread chain or the devices for transferring a thread from the chain to the knotter carriage have failed to place a thread upon the knotter carriage, or if the thread has been broken after being placed on the knotter carriage, and therefore no thread intervenes between the forks 172 and 181, said form 172 passes the fork 181 upon the outward movement of the knotter-carriage, the fork arm 172 is not rocked upon its pivot, the hooked arm 174 does not engage the angular stud 177, and the feed for the thread chain is permitted to operate to move said thread chain forward one link to bring a reserve thread into position to be stripped by the transfer arm to be later described from the supports upon said link to the supports for said thread upon the knotter-carriage. This position of the reserve thread is shown in Fig. 44. A plate 94ª (Figs. 2 and 3) fixed to one end of the air funnel 94 protects the strand $a$ from being drawn out of place by the exhaust air current.

The vertically reciprocating pawl 61 (Fig. 3) for moving the thread chain is pivotally connected with the forward end of the bell-crank arm 62 and receives its motion therefrom. A spring 188 tends to hold the pawl 61 in position to engage a pin 33 upon one side of the wheel 30 at every reciprocation of said pawl, but when there is a reserve thread on the knotter carriage the pawl is moved out of position to engage with said pins 33 by a pivoted arm 189, (Figs. 2, 3, 7 and 8) one end of which arm is beveled and adapted to be engaged by the correspondingly beveled end of the sliding plate 178 (Figs. 8 and 12). When the angular stud 177 is engaged by the hooked arm 174 of the fork 172, the plate 178 is locked to the knotter-carriage 79, and its inclined end engaging with the inclined surface upon the lever 189 moves said lever upon its pivot and rocks said vertically reciprocating pawl 61 out of position to engage with the pins 33. When no thread intervenes between the thread forks 172 and 181, the hooked arm 174 of said fork 172 will not engage the angular stud 177, and the plate 178 will stop when it comes into contact with the beveled end of the lever 189, without moving said lever, the consequence being that the vertically reciprocating pawl 61 grasps a pin 33 in the side of the wheel 30 and moves said wheel, thus moving the thread chain a distance of one link thereof. A stop block 190 (Figs. 2 and 7) fixed upon the guide bar 69 automatically restores the sliding plate 178 to its normal position when the carriage reaches one extremity of its movement.

As indicated in Fig. 12, the rear ends of the slots 179 are slightly up-turned. Gravity thus provides sufficient resistance to inertia movement of the plate 178 so that said plate shall remain stationary with relation to the knotter carriage, and thus be in position to be locked by the hook 174. If, however, there is no reserve thread on the carriage, the plate 178 is free to be stopped by the lever 189 before the outward movement of the carriage has been completed.

During the return movement of the knotter-carriage (that is, the movement from left to right, Figs. 2 and 7) it is necessary that the detector-stops 91 be held out of the path of the projection 110ª on the slide plate 110, and this I accomplish by means of the bar 191 (Figs. 5 and 6) fixed on the rock shaft 192, an arm 193 of which shaft is pivotally connected by means of the link 194 with the pivotal arm 195, a roller 196 mounted upon said arm rolling in peripheral contact with the cam 23. The construction of said cam is such that the bar 191 is rocked against said detector-stops while the knotter-carriage moves from left to right (Fig. 2) and is lifted from said stops when the carriage travels in the opposite direction. A coiled spring 197 holds the roller 196 in contact with the cam 23.

A flexible pipe 198 (Fig. 1) is connected at one end with the exhaust fan 96 and its other end is slipped over a nipple 199 (Fig. 18ª) on a slide 200 which slide is vertically movable upon the rod 201 rigidly supported in any suitable manner beside the upright portion of the thread chain 45. The slide 200 has an undercut groove 200ª therein through which the links 46 of the thread chain 45 are arranged to pass. Said slide is movable vertically in order that the slide may be brought into coincidence with any link of the chain 45. The slide has a cam 202 adapted to engage the pin 56 upon the arm 52ª of the closure 51. When the cam 202 of the slide 200 is slid into engagement with said pin, the closure 51 is moved away from the open end of the tube 50 and the tube 198 is placed in coincidence with said tube 50, inducing a current of air in said holding tube.

The operator standing at the forward side of the machine removes empty bobbins from the bobbin boxes and replaces them with filled bobbins as the bobbin box chain is moved. Before placing a bobbin in the bobbin box the operator unwinds a portion of the thread from said bobbin and after the bobbin is placed in its box places a loop of said thread upon the thread chain as indicated in Fig. 17, releasing the end of said thread at the end of the holding tube 50, into which tube it is drawn by the current of air passing through said tube, the screen preventing the thread from being drawn into the nipple 199. When the air tube 198 is moved from this holding tube 50 to the next adjacent tube, the closure 51 is drawn by its spring 53 over the outer end of said tube, clamping the thread therein. The thread chain is mounted upon the wheels 43 and 44, which wheels are somewhat larger in diameter than those (38) carrying the bobbin-box chain, and therefore said thread chain moves slightly faster than the bobbin boxes, which difference in speed is provided to insure a constant tension upon each thread held upon the thread-holding chain, the threads unwinding from their bobbins as the thread chain moves rearward. The movement of the thread chain carries the loops of thread held thereon toward the knotter-carriage, said carriage moving under the thread chain at each reciprocation of the carriage.

When the reserve thread upon the knotter carriage has been tied to an exhausted thread, or when the forks 172 and 181 have detected the absence of a reserve thread from the knotter carriage, a mechanism transfers to said carriage, upon its next return movement, the thread carried into position above the path of the knotter by the movement of the thread chain. This transfer mechanism comprises an arm 203 (Figs. 2, 3, 4 and 7) pivotally mounted upon a stud 204 and laterally slidable on said stud. The arm 203 is vertically actuated by means of an arm 205 (Fig. 4) having a roller stud 206 adapted to bear upon the periphery of the cam 24 and to be held in contact with said cam by means of the coiled spring 207, a link 208 extending between the ends of said arms 203 and 205 communicating motion from the arm 205 to the arm 203.

208$^a$ (Figs. 2 and 4) is a guide bracket for the link 208. The arm 203 is provided with an extensible forward end 203$^a$ secured to said arm by means of screws 203$^b$ passing through elongated openings 203$^c$ in said adjustable forward end and entering screw-threaded openings in the arm 203. The forward end 203$^a$ of the arm 203 carries a transversely extending rod 209 (Fig. 24) having a diverging fork 210 at one of its ends and a pin 211 intermediate its ends. The arm 203 also has a wire 212 (Fig. 7) extending transversely therefrom and parallel with the rod 209, both the rod 209 and the wire 212 being adapted to press downward upon the thread loop held on the bracket 59 (Figs. 17 and 7) of one of the links of the thread chain in transferring said loop from the thread chain to the supports for said loop upon the knotter-carriage. The arm 203 is moved laterally upon the stud 204 by means of the lever 213 (Fig. 4) pivotally mounted upon the stud 214 and having a roller 215 adapted to roll in contact with the cam 25. A coiled spring 215$^a$ holds the roller 215 in contact with said cam. The upper end of the lever 213 is forked to receive a pin 203$^d$ fixed upon the hub of the lever 203. The sidewise movement of the arm is given it to withdraw the rod 209 and the wire 212 from the path of the thread chain. To permit of the lateral movement of said transfer arm, the pivotal connection between said arm and the link 208 is made by means of a pin 203$^e$ (Fig. 2) fixed to said arm and slidable in an opening in the upper end of the link 208. The downward movement of the transfer arm is limited by the adjustable stop bracket 216 (Fig. 3). The transfer arm 203, by means of the rod 209 and the wire 212, engages the reserve thread supported upon the link of the chain brought forward by the last preceding movement of said chain, and by the movement of said arm said loop is stripped downward from its support 59 on said link. When the knotter-carriage 79 is moved under the thread-chain the portion $a$ of the thread rides up over the curved nose 217$^a$ of a plate 217 fixed to the knotter-carriage and drops into the slot 218 in said plate. The end of the reserve thread that is held within a tube 50 on the thread chain is transferred to the tube 157 moving with the knotter-carriage by mechanism to be next described.

A lever 219 (Fig. 3) is pivotally supported upon the guide sleeve 35$^a$ for the thread chain. The rear end of this lever is held in contact with the teeth 34 on one side of the wheel 30 by means of the coiled spring 220. When the wheel 30 is rotated to move a link of the thread chain into proper position for the transferring operation the spring 220 causes the rear end of the lever 219 to spring upward at the rear of one of said teeth 34 and causes a projection 221 on the opposite end of said lever to impinge upon the pin 56 of the closure 51 for the holding tube just brought forward, rocking said closure upon its pivot and opening said holding tube. At the instant of the opening of this closure, the tubular stem 159 of the slidable air tube 157 is immediately below said tube, and the end of the thread released from the holding tube 50 by the movement of the closure 51 is quickly drawn by the air current into said tube 157 and guided into the slot 160 by the inclined end wall 159$^a$ of the stem 159.

The operation of transferring a reserve thread from the thread chain to the knotter carriage is illustrated in Figs. 7 and 44 to 47 and is as follows: Before the knotter carriage has completed its return movement, the thread chain has moved into position to support a reserve thread above the path of movement of the knotter carriage, as shown in Fig. 44. The rod 209 and the wire 212 are about to be moved (toward the left, Fig. 44) into position above the thread, by the cam 25 (Fig. 4). When the tube 159 arrives beneath the holding tube 50 that holds the strand $b$ of the reserve thread (as shown in Fig. 45), said strand is released through the action of the device 221 and is immediately drawn into the slot 160. The strand $b$ is beneath the horizontal plane of the nose 217$^a$ (Fig. 10) of the plate 217 which is fixed to the knotter carriage. The strand $a$ running to the bobbin has been cammed up by the nose 217ª and has dropped into the slot 218 in the plate 217. The rod 209 and the wire 212 have moved into position above the thread, as shown in full lines in Fig. 45 and in dotted lines in Fig. 47, the point 24ª of the cam 24 (Fig. 4) having raised the arm 203. As the knotter carriage is finishing its return movement, the arm 203 descends, the rod 209 and the fork 210 pushing the strands *a* and *b* down until they are clear of the hook 57 (Fig. 47) and below the plate 94ª (Fig. 3), the strand *a* extending across the hook 175 (Figs. 9ª and 46), and the strand *b* lying in front of the hook 171. The pin 211 prevents the strand *b* from moving so far to the right (as viewed in Fig. 46) as to be unable to enter the hook 171. The downward movement of the wire 212 and the advancing movement of the hook 169 have withdrawn the loop of the reserve thread from the notch 60ª of the bracket 59. The wire 212 depresses the strand *a* below the pin 58. As the knotter carriage completes its return movement, the inclined upper portion of the thread-guide 154 (best shown in Fig. 25) cams up the strand *b* which extends from the notch 60 to the slot 160, said strand snapping over the highest point of said guide and dropping behind the tying-bill 125. The pin 58 prevents the guide 154 from displacing the strand *b* as said guide advances toward the right (Fig. 46). As the knotter carriage commences moving outwardly, the hook 169 removes the loop from the notch 60, the strand *a* passes within the hook 170, and the strand *b* enters the hook 171. The inclined lower edge 169ª (Fig. 25) of the hook 169 cams the strand *b* down within the hook of the clamp arm 143. The arm 203 is now given an upward movement by the point 24ᵇ of the cam 24 in order that the strand *b* shall not foul on the fork 210, and in order that the stem of the thread fork 172 shall not strike the pin 211 as the knotter carriage moves outwardly. The slackness occasioned by the release of the reserve thread from the supports on the thread chain, and by the disengagement of said thread from the rod 209 and the wire 212, is removed by the action of the exhaust air current in the tube 156, the thread being drawn into place within the tying bill 125, as shown in Fig. 8. Unless properly directed the new thread might be drawn into the wrong space in the spacing comb 88. Any such misplacing of the thread is prevented by the slotted plate 217. Upon the plate 187 is pivoted a hook 222 held normally away from the slot 218 by means of a stud 223 on said hook extending through a slotted opening 224 in said plate 187 into position to be engaged by a pin 225 fixed with relation to the drive carriage 80. A coiled spring 226 tends to draw the hook 222 forward so that its upper end extends across and closes the open upper end of the slot 218 in the plate 217. When the carriages 79 and 80 travel together, the hook 222 is held away from the slot 218 as indicated in Fig. 10, and the slot 218 in the plate 217 is open at its upper end, but when the carriages separate in the tying operation the pin 225 is withdrawn from the stud 223 and the spring 226 throws the hook 222 into the position indicated in Fig. 11 to close the upper end of the slot and hold the reserve thread therein. By the time the carriages come together again, the slack in the thread has been taken up by the winding mechanism, and as soon as the carriages assume their normal relative positions, in which they are locked together, the hook 222 is swung away from the upper end of the slot 218, permitting the thread to be drawn from said slot into its proper space in the comb 88 by the tension of winding. It will be understood that the detector-stop 91 which was moved outward by the exhausted thread determined the point at which the carriage 79 was stopped, and the slot 218 in the plate 217 is so located that it will exactly register with the notch in the comb 88 through which said exhausted thread passed before it became exhausted and while it was still an active thread. This register of the slot 218 with the vacant notch in the comb 88 insures the reserve thread being drawn into the vacant notch in the comb 88 when said thread is drawn from the slot 218 into its normal position as an active thread by the tension of winding being placed upon it.

A thread-supporting wire 217ᵇ (Figs. 7, 8 and 9) is secured to and extends forwardly from the plate 217, a portion of said wire lying parallel with the air tube 157. The purpose of this wire is to support that portion *a* of the reserve thread which extends from the slot 218 to the bobbin and thus prevent it from being drawn into the open upper end of the stem 159 of the suction tube 157 when said stem passes beneath said thread. The end of the wire 217ᵇ extending parallel with the tube 157 is made short enough to permit the loose end *b* of the reserve thread to slip off said wire when said end is drawn into the horizontal portion of the slot 160. The position of the reserve thread when inserted in the stem 159 is indicated by a dotted line in Fig. 7. The reserve thread is held reasonably taut, slack being taken up in the portion which lies within the slot 160 of the tube 157.

In the operation of the winder, a sufficient number of bobbins are placed in the bobbin boxes 37 to fill the spaces of the combs 20 and 88. The bobbin-box chain is then slowly moved, and each bobbin thread is drawn through the spacing comb 88, beneath one of the detector-stops 91, through the guide comb 20, over the idler roller 18, to the section beam A. The bobbin-box chain is moved until all the bobbins are on the rear side of the chain, each thread passing through its proper spaces between the partitions 90 to separate each thread from adjacent threads to prevent tangling. If the section beam is now rotated, threads from the bobbins in the bobbin boxes will be wound upon the section beam.

Power is communicated to the mechanism by means of a belt (not shown) passing over the tight pulley 5. The suction fan 96 is driven independently by means of a separate belt (not shown) passing over the usual drive pulley of said fan.

To provide a number of reserve threads, the attendant places bobbins in the bobbin boxes of the forward portion of the bobbin-box chain and moves the slide 200 upon the vertical guide rod 201 so that the end of the flexible air tube 198 registers with the holding tube 50 upon one of the links of the thread chain 46, the cam 202 upon said slide at the same time engaging the pin 56 upon the L-shape arm of the closure 51 of said tube, removing said closure from the outer end of the tube 50. A bobbin is placed within one of the bobbin boxes adjacent to or slightly above the open thread-holding tube 50, and the free end of the thread from said bobbin passed through the opening 42 in the bobbin box and looped over the bracket 59 of the link next below said open holding tube, the end of said thread being slipped by the operator into said open tube, where the thread is held by the ingoing current of air until the slide 200 is moved away from said tube, permitting the closure 51 to shut upon and mechanically grasp the end of the thread lying in said tube. The slide 200 is moved into register with successive holding tubes 50, and additional bobbins placed in the bobbin-boxes of the forward portion of the bobbin-box chain.

The knotter-carriage 79, connected with the drive carriage 80 by means of the pawl 98, is moved to and fro upon the guide bar 69 directly in front of the detector-stops 91.
When one of the threads passing from the bobbin boxes of the rear portion of the bobbin box chain and being wound upon the section beam breaks or is exhausted, the loose end of said thread is drawn upward into the funnel 94 by means of the exhaust air current in said funnel. When said thread passed through its space in the comb 88 it was held from contact with the lower end of its detector-stop 91, but when said thread is drawn upward into the air funnel it is drawn against the lower end of said stop, and the continued winding of the section beam swings backward the stop against which the exhausted thread impinges.

Upon the next outward movement of the knotter carriage, the projection 110ᵃ of the slide plate 110 engages the detector stop 91 for the exhausted thread. (Fig. 8.) This slide plate is brought to a standstill by means of said stop, the remainder of the carriage moving a little distance thereafter. The relative movement between the slide plate and the remainder of the carriage moves the roller stud 167 through the cam-groove 163 in the cradle cam 162, and rocks the cradle cam to lift the arm 164 (the hooks 165 at the forward end of said arm engaging the exhausted thread) and then to lower said arm with said thread into position for the tying operation. The relative movement between the slide plate 110 and the remainder of the carriage also presses the foot 109 into engagement with the upper arm 107 of the bell-crank lever 106, rocking the arm 112 of said lever downward against the arm 113 fixed upon the shaft 97, oscillating said shaft and withdrawing the pawl 98 from engagement with the tooth 99 of the drive carriage (Fig. 11), thus separating the knotter-carriage from the drive carriage.

The oscillation of the shaft 97 throws the pawl 100 into engagement with the teeth of the rack bar 73, and the relative movement of the carriages withdraws the stud 105 from the trigger arm 104 and permits the spring 103 to throw the pawl 102 into engagement with the teeth of the rack 72, the effect of which is to lock the knotter-carriage from movement in either direction upon the guide-bar 69. Continued (separating) movement of the drive carriage with relation to the knotter-carriage causes the stud 116 to engage the fork 115 and to rotate the knotter-actuating shaft 114, moving the knock-off finger forward to remove the exhausted thread from the hooks 165 and actuating the tying mechanism to tie the reserve thread to said exhausted thread. The separation of the knotter-carriage and the drive carriage, by removing the stud 225 from the stud 223 permits the pivoted thread-holding hook 222 to close the upper end of the slot 218 in the plate 217, holding the reserve thread therein. When the drive carriage returns the re-engagement of the studs 225 and 223 swings the hook 222 into its normal position and opens the upper end of the slot 218, said slot registering with the space in the comb 88 into which the reserve thread (now an active thread) is to be drawn.

As the outward movement of the knotter carriage was cut short by the detector stop of the exhausted thread, the plate 178 was not carried into engagement with the lever 189, and hence the pawl 61 was permitted to move the thread chain to bring a reserve thread into position above the path of movement of the carriages 79 and 80. Upon the return movement of said carriages the reserve thread is transferred to the knotter carriage in the manner hereinbefore described.

A drop-wire mechanism of ordinary construction may be placed between the knot-tying mechanism and the beam to stop the machine should threads break between the points mentioned.

The embodiment herein shown of my invention is adapted to wind a comparatively small number of threads, but it will be understood that said embodiment is merely illustrative and that the machine may be made of any desired capacity.

This application is a continuation of application Serial No. 112,705, filed June 21, 1902.

I claim as my invention:

1. In a winder, in combination, a mechanism for winding a thread upon a section beam; and means for joining other threads to the thread being wound to make a continuous thread for the winding mechanism without interrupting the winding of said continuous thread.

2. In a winder, in combination, a mechanism for winding a thread; and means controlled by the exhausting of said thread for joining a reserve thread to said exhausted thread.

3. In a winder, in combination a mechanism for winding a thread; and means controlled by the exhausting of said thread for joining a reserve thread to the thread being wound without interrupting the winding of said thread.

4. In a winder, in combination, a mechanism for winding a thread; means controlled by the exhausting of said thread for joining a reserve thread to said exhausted thread; and means for presenting a reserve thread to the joining means.

5. In a winder, in combination, a mechanism for winding a thread; means controlled by the exhausting of said thread for joining a reserve thread to the thread being wound without interrupting the winding of said thread; and means for presenting a reserve thread to the joining means.

6. In a winder, in combination, a mechanism for winding a thread; means controlled in their movements by the exhausting of said thread for joining a reserve thread to said exhausted thread; means for presenting a reserve thread to the joining means; and means for supporting the unwound portion of one of said threads.

7. In a winder, in combination, a mechanism for winding a thread; means controlled by the exhausting of said thread for joining a reserve thread to the thread being wound without interrupting the winding of said thread; and means for supporting the unwound portion of said thread.

8. In a winder, in combination, a mechanism for winding a thread; means for joining a reserve thread to the thread being wound without interrupting the winding of said thread; and means for detecting the exhausting of said last mentioned thread.

9. In a winder, in combination, a mechanism for winding a thread; means controlled in their movements by the exhausting of said thread for joining a reserve thread to said exhausted thread; and means for detecting the exhausting of said last mentioned thread.

10. In a winder, in combination, a mechanism for winding a thread; means for supporting the unwound portion of the thread; means controlled by the exhausting of the thread for joining a reserve thread to the thread being wound without interrupting the winding of said thread; and means for presenting a reserve thread to the joining means.

11. In a winder, in combination, a mechanism for winding a thread; means for supporting the unwound portion of said thread; means for detecting the exhausting of said thread; and means for joining a reserve thread to said exhausted thread without interrupting the winding of said thread.

12. In a winder, in combination, a mechanism for winding a plurality of threads; and means for joining a reserve thread to an exhausted thread without interrupting the winding of any of said threads.

13. In a winder, in combination, a mechanism for winding a plurality of threads; and means for automatically joining a reserve thread to an exhausted thread without interrupting the winding of any of said threads.

14. In a winder, in combination, a mechanism for simultaneously winding a plurality of threads upon a container; means for joining a reserve thread to an exhausted thread; and means for presenting a reserve thread to the joining means.

15. In a winder, in combination, a mechanism for winding a plurality of threads; means for supporting the unwound portions of said threads; means for preventing a reserve thread; and means for automatically joining said reserve thread to an exhausted thread without interrupting the winding of any of said threads.

16. In a winder, in combination, a mechanism for winding a plurality of threads; movable means for supporting active and reserve threads; means for joining a reserve thread to an exhausted thread; and a mechanism for detecting exhausted threads, which detecting mechanism controls the joining means.

17. In a winder, in combination, a mechanism for winding a plurality of threads; a movable thread-support comprising a series of bobbin boxes; and means for joining a reserve thread to an exhausted thread.

18. In a winder, in combination, a mechanism for winding a plurality of threads; a movable thread-support comprising a series of bobbin boxes; and means for joining a reserve thread to one of the threads being wound without interrupting the winding of said threads.

19. In a winder, in combination, a mechanism for winding a plurality of threads; a movable thread-support comprising a series of bobbin boxes; and means controlled by the exhausting of one of said threads for joining a reserve thread to the exhausted thread.

20. In a winder, in combination, a mechanism for winding a plurality of threads; a vertically extending endless chain of bobbin supports, the threads from the bobbins upon said supports extending to said winding mechanism; and means for supporting and moving said chain.

21. In a winder, in combination, a mechanism for winding a plurality of threads; a movable bobbin support comprising an endless series of bobbin holders, the threads from the bobbins in said holders extending to said winding mechanism; and means for joining a reserve thread to one of the threads being wound.

22. A winder having, in combination, beam-rotating means, a plurality of boxes adapted to contain bobbins, the threads of the bobbins extending to the beam, and means for moving the boxes to withdraw the boxes as the bobbins therein are emptied.

23. The combination, with a winder, of detectors each movable by contact with a thread being wound, and pneumatic means for moving an exhausted thread into contact with a detector.

24. A winder comprising an endless vertically arranged chain of bobbin boxes, and means for supporting and rotating a warp beam, the threads from the bobbins contained in said boxes extending to said beam.

25. In a winder, in combination, means for supporting and rotating a warp beam; a series of bobbin boxes, the threads from bobbins in said boxes extending to the warp beam; and means for moving the series of boxes to move the boxes away from the beam as the bobbins in the boxes are emptied.

26. In a winder, in combination, a mechanism for winding a plurality of threads; a thread-support comprising an endless chain of bobbin boxes; and means for moving said chain to bring full bobbins to the portion of the chain adjacent to the winding mechanism and to carry empty bobbins to the side of the chain farthest removed from said winding mechanism.

27. In a winder, in combination, a mechanism for winding a plurality of threads; an endless chain comprising a series of bobbin boxes for holding active and reserve threads; and means for joining a reserve thread to an exhausted active thread.

28. In a winder, in combination, a mechanism for winding a plurality of threads; an endless chain comprising a series of bobbin boxes for holding active and reserve threads; means for joining a reserve thread to an exhausted active thread; and a thread-carrying chain for presenting a reserve thread to the joining means.

29. In a winder, in combination, a mechanism for winding a plurality of threads; a bobbin box chain comprising a series of bobbin boxes for supporting active and reserve threads; means for joining a reserve thread to an exhausted thread; and a mechanism for detecting an exhausted thread, which detecting mechanism controls the joining means.

30. In a device for presenting threads to a winding mechanism, in combination, a movable bobbin box chain; means for joining reserve threads to exhausted threads; a thread chain for holding the ends of reserve threads and for moving said ends into proximity to the joining means, which thread chain is made up of a series of links, each having a holding tube, a spring-actuated closure for said holding tube, and a holding bracket; means for inducting a current of air in one of the holding tubes of said chain; and means for transferring the ends of said reserve threads to said joining means.

31. In a winder, in combination, means for supporting and rotating a warp beam; a bobbin box chain; a spacing comb; an air funnel; means for inducing a current of air in the air funnel; a series of detector stops; the threads from bobbins in the bobbin boxes extending through the spacing comb, thence transversely of the air funnel, and thence across the series of detector stops to the beam; a reserve thread chain; and a reciprocatory knot-tying mechanism for uniting reserve threads to exhausted threads.

32. In a winder, in combination, means for supporting and rotating a warp beam; a bobbin box chain; a spacing comb; an air funnel; means for inducing a current of air in the air funnel; a series of detector stops the threads from bobbins in the bobbin boxes extending through the spacing comb, thence transversely of the air funnel, and thence across the series of detector stops to the beam; a reserve thread chain; a reciprocatory knot-tying mechanism for uniting a reserve thread to an exhausted thread; and a pivoted arm for transferring a thread from the thread chain to a point adjacent to the knot-tying mechanism.

33. In a winder, in combination, means for supporting and rotating a warp beam; a bobbin box chain; a spacing comb; an air funnel; means for inducing a current of air in the air funnel; a series of detector stops adjacent to the air funnel, the threads from bobbins in the bobbin boxes extending through the spacing comb, thence transversely of the air funnel, and thence across the series of detector stops to the beam; a reserve thread chain; a knot-tying mechanism for uniting reserve threads to exhausted threads and a carriage for said knot-tying mechanism adapted to reciprocate in proximity to said detector stops.

34. In a winder, in combination, means for supporting and rotating a warp beam; a bobbin box chain; a spacing comb; an air funnel; means for inducing a current of air in the air funnel; a series of detector stops operable by threads moved by said air current; a thread-chain; a knot-tying mechanism; a knotter-carriage; a drive carriage; means for locking the knotter-carriage and the drive carriage together; and means actuated by a detector stop for separating said carriages, the knot-tying mechanism being actuated by such separation.

35. In a winder, in combination, means for supporting and rotating a warp beam; a bobbin box chain; a spacing comb; an air funnel; means for inducing a current of air in the air funnel; a series of detector stops operable by threads moved by said air current; a thread chain; a knot-tying mechanism; a knotter-carriage; a drive carriage; means for locking the knotter-carriage and the drive carriage together; means actuated by a detector stop for separating the knotter-carriage from the drive carriage, the knot-tying mechanism being actuated by such separation; and a pivoted arm for transferring a reserve thread from the thread chain to the knotter-carriage.

36. In a winder, in combination, means for supporting and rotating a warp beam; a bobbin box chain; a spacing comb; an air funnel; means for inducing a current of air in the air funnel; a series of detector stops operable by threads moved by said air currents; a reserve thread chain; a reciprocatory knot-tying mechanism arranged to be controlled by said detector stops; and means comprising a pivoted arm and an open air tube for transferring a reserve thread from the thread chain to the knot-tying mechanism.

37. In a winder, a series of traveling thread clamps; and means for opening said clamps.

38. The combination, with an endless chain adapted to support a plurality of bobbins, of an endless chain adapted to carry a portion of a thread unwound from one of said bobbins, and means for moving said chains.

39. In a winder, a series of bobbin boxes, means for moving the series of bobbin boxes, and a series of thread-clamps movable in an endless path, a portion of said path extending parallel with the direction of movement of the series of bobbin boxes.

40. A textile machine comprising a mechanism for acting on threads, means for supporting a plurality of bobbins, and an endless movable chain for moving to said mechanism the ends of threads extending from the bobbins, said chain being provided with means for attaching threads thereto.

41. A textile machine comprising a mechanism for acting on threads, an endless vertically extending series of bobbin boxes, and an endless movable chain, a portion of which chain extends parallel with and adjacent to a portion of said series of bobbin boxes, another portion of said chain extending into operative relation to said mechanism, said chain being provided with means for attaching thereto threads extending from bobbins in said bobbin boxes.

42. A textile machine comprising a mechanism for acting on threads, an upper and a lower pulley, an endless series of bobbin boxes mounted upon said pulleys and providing forward and rear vertical runs, an endless chain, means for supporting said chain so that a portion thereof shall extend parallel with and adjacent to the forward run of said bobbin box series, another portion of said chain extending into operative relation to said mechanism, and devices on said chain to hold the ends of yarn extending from bobbins in said boxes.

43. The combination with an endless series of thread end receivers, of means for placing thread-ends in said receivers.

44. The combination with a movable plurality of receivers, of thread-end-engaging means located adjacent to the path of said receivers for placing thread-ends in said receivers.

45. The combination with an endless series of thread-receivers and loop-supporting devices, of means located adjacent to the path of said receivers for placing in said receivers the ends of threads looped upon said loop-supporting devices.

46. The combination, with an endless movable chain carrying a thread-receiver, of pneumatic means for placing a thread end in said receiver.

47. The combination, with an endless movable chain carrying a thread-receiver, of means for placing a thread end in said receiver, and means for releasably connecting the thread end to the chain.

48. The combination, with an endless movable chain carrying a plurality of thread-receiving tubes, of means movable into register with any of said tubes for inducing a current of air therein.

49. The combination, with a movable carriage for supporting a loop of a reserve thread, of a suction tube movable with said carriage for holding one end of said thread, and means for inducing an air current in said suction tube.

50. The combination with an endless series of thread receivers, of means located adjacent to the path of said receivers for inducing an exhaust air current into said receivers.

51. The combination of an endless movable chain, a plurality of thread receivers upon said chain, means upon said chain adapted for engagement by a loop of thread, and means for placing in one of said receivers one end of a thread looped over such loop-engaging means.

52. The combination of an endless bobbin-box chain having a vertical portion, an endless chain carrying thread-receivers, the last mentioned chain having a portion extending parallel with and adjacent to the vertical portion of the bobbin-box chain, a guide extending parallel with the vertical portion of said thread-receiver chain, and means movable vertically upon said guide into operative relation with the thread receivers for inducing an exhaust air current in such receivers.

53. In a winder, a support for a bobbin, means for supporting the end portion of the thread extending from the bobbin, a traveling thread-support, and means for transferring the thread end portion from the supporting means to the traveling thread-support.

54. In a winder, a reciprocatory reserve thread end support in combination with means for placing a thread end upon said support.

55. In a winder, a support for a bobbin, means for supporting the end portion of the thread extending from the bobbin, a thread support comprising movable thread-engaging devices, and means for transferring a loop of thread from said supporting means to said thread-engaging means.

56. A thread-support comprising a hook and a pneumatic suction tube, in combination with means for placing a loop of thread in engagement with said hook and tube.

57. A winder having, in combination, means for continuously rotating a section beam, a plurality of active thread supplies, the threads from which are simultaneously wound on said beam; a knotter; means for supporting a reserve thread supply; a detector for each active thread; and means controlled by any one of the detectors to cause a reserve thread to be tied by the knotter to any one of the active threads when its supply is exhausted.

58. In a textile machine, in combination, means for supporting a series of threads in a sheet, and means for joining a reserve thread to one of the threads of said series comprising a normally idle knotter and a reserve thread-support arranged to be recurrently reciprocated transversely of said series of threads, and means for selectively operating the knotter.

59. The combination with a plurality of suction tubes and means for clamping threads to said tubes, of means for inducing a current of air in said tubes.

60. The combination with a movable thread-support comprising a plurality of suction tubes and means for clamping threads to said tubes, of means movable into registry with any one of said tubes for inducing a current of air therein.

61. In a textile machine, means for winding a plurality of threads; a spacing comb for the threads being wound, and means for placing a reserve thread in proper position at the spacing comb.

62. In a textile machine, in combination, means for winding a plurality of threads; a spacing comb for the threads being wound; means for placing a thread in proper position at the spacing comb, and means for joining said thread to another thread.

63. In a textile machine, in combination, means for winding a plurality of threads; a spacing comb for the threads being wound; means for placing a reserve thread in proper position at the spacing comb; means for joining said reserve thread to another thread; and means for preventing misplacement of said reserve thread.

64. In a textile machine, in combination, means for winding a thread upon a suitable container; a knot-tying mechanism for operating upon said thread; means for detecting exhaustion of said thread; and a pivoted arm controlled by said detecting means for engaging said thread when exhausted and moving it into operative relation to said operating mechanism.

65. In a winder, in combination, a mechanism for winding a plurality of threads; means for supporting active threads and reserve threads; a knot-tying mechanism adapted to be moved into proximity to each of said active threads, which knot-tying mechanism is also adapted to carry a reserve thread; mechanism for placing an exhausted thread in a position to be acted upon by the knot-tying mechanism; and detectors for exhausted threads adapted to actuate said thread-placing mechanism and said knot-tying mechanism.

66. In a winder, in combination, a mechanism for winding a plurality of threads; means for supporting active threads and reserve threads; means for joining a reserve thread to an exhausted active thread without interrupting the winding of the active thread; and means for presenting said reserve thread to said joining means.

67. In a winder, in combination, a mechanism for winding a plurality of threads; means for supporting active threads and reserve threads; a knot-tying mechanism adapted to carry a portion of a reserve thread into proximity to any one of the active threads; and means for presenting an exhausted active thread to said knot-tying mechanism.

68. In a winder, in combination, a mechanism for winding a plurality of threads; means for supporting active threads and reserve threads; a knot-tying mechanism adapted to be moved transversely of the length of said active threads, which mechanism is adapted to carry a portion of a reserve thread into proximity to any one of the active threads; and means for presenting an exhausted active thread to the knot-tying mechanism.

69. In a winder, in combination, a mechanism for winding a plurality of threads; means for supporting active threads and reserve threads; a knot-tying mechanism adapted to be reciprocated transversely of the length of said active threads, which knot-tying mechanism is adapted to carry a portion of a reserve thread; a stop for arresting the movement of the knot-tying mechanism when adjacent to an exhausted active thread; and means for presenting the exhausted active thread to the knot-tying mechanism in a position to be tied to said reserve thread.

70. In a device for presenting threads to a winding mechanism, in combination, a movable support for active and reserve threads; means for joining reserve threads to exhausted threads; a thread chain for holding the ends of reserve threads and for moving said ends into proximity to the joining means; and means for transferring the ends of said reserve threads to said joining means.

71. In a winder, in combination, a mechanism for winding a plurality of threads; means for supporting active threads and reserve threads; and a knot-tying mechanism adapted to carry a portion of a reserve thread, which mechanism is movable into proximity to any one of said active threads to join said reserve thread to an exhausted active thread.

72. In a winder, in combination, a mechanism for winding a plurality of threads; a chain for supporting active threads and reserve threads; a knot-tying mechanism adapted to carry a portion of a reserve thread, which mechanism is movable into proximity to said active threads; and a thread chain for presenting reserve threads to said knot-tying mechanism.

73. In a winder, in combination, a mechanism for winding a plurality of threads; a chain for supporting active threads and reserve threads; a reciprocatory carriage; a knot-tying mechanism mounted on said carriage; means on the carriage for supporting a portion of a reserve thread; means for presenting an exhausted active thread to said knot-tying mechanism; and means for actuating the knot-tying mechanism to join the reserve thread to said exhausted thread.

74. In a winder, in combination, a mechanism for winding a plurality of threads; means for supporting active and reserve threads; means for joining a reserve thread to an exhausted thread; and a mechanism for detecting exhausted threads and actuating the joining means.

75. In a winder, in combination, a mechanism for winding a plurality of threads; means for supporting active threads and reserve threads; means for detecting an exhausted thread; a knot-tying mechanism adapted to carry a portion of a reserve thread; and means actuated by said detecting means for presenting said exhausted thread to the knot-tying mechanism in a position to be joined with said reserve thread.

76. In a winder, in combination, a mechanism for winding a plurality of threads; means for supporting active threads and reserve threads; means for detecting an exhausted thread; a knot-tying mechanism adapted to be moved into proximity to said active threads, also adapted to carry a portion of a reserve thread; and means actuated by said detecting means for presenting an exhausted thread to the knot-tying mechanism in a position to be joined with the reserve thread carried thereby.

77. In a winder, in combination, a mechanism for winding a plurality of threads; means for supporting active threads and reserve threads; an air funnel in proximity to said active threads; means for inducing a current of air in said air funnel; a knot-tying mechanism adapted to carry a portion of a reserve thread; and a device for actuating said knot-tying mechanism, located near the mouth of said air funnel and adapted to be engaged by a thread drawn upward within said air funnel by the air current.

78. The combination, with a winder, of pneumatically actuated means for detecting the exhaustion of a thread being wound.

79. The combination, with a winder, of a knot-tying mechanism recurrently movable into position adjacent to each thread being wound, a series of members movable into the path of said knot-tying mechanism to position the latter, and means for moving an exhausted thread into contact with one of said members to thereby cause said member to move into the path of the knot-tying mechanism.

80. The combination, with a winder, of a knot-tying mechanism recurrently movable into position adjacent to each thread being wound; a series of members movable into the path of said knot-tying mechanism to position the latter; and means for pneumatically moving an exhausted thread into contact with one of said members to thereby cause said member to move into the path of the knot-tying mechanism.

81. The combination, with a winder, of a knot-tying mechanism recurrently movable into position adjacent to each thread being wound, a series of pivoted members movable into the path of said knot-tying mechanism to position the latter, and means for pneumatically moving an exhausted thread into contact with the free end of one of said members to thereby cause said member to swing into the path of the knot-tying mechanism.

82. In an apparatus for detecting exhausted or broken threads, in combination, an air funnel; means for inducing a current of air in said funnel; and an actuating device located near the mouth of said air funnel and adapted to be engaged by and operated by a thread drawn upward within said air funnel by the air current.

83. In an apparatus for detecting exhausted or broken threads, in combination, an air funnel; means for inducing a current of air in said funnel; and a stop located near the mouth of said air funnel and adapted to be engaged by a thread drawn upward within said air funnel by the air current.

84. In a winder, in combination, a mechanism for winding a plurality of threads; means for detecting the exhausting of any of said threads, which detecting means comprises a pneumatic means for acting upon a thread; and means for joining a reserve thread to an exhausted thread.

85. A winder having, in combination, means for winding a plurality of threads; a knotter movable transversely of the threads and arranged to carry a reserve thread; a plurality of thread-controlled stops to position the knotter; and means to actuate the knotter to tie the reserve thread to one of the other threads.

86. In a winder, in combination, a mechanism for winding a plurality of threads; means for detecting the exhausting of any of said threads, which detecting means comprises an air funnel and means for inducing a current of air in said funnel; and means for joining a reserve thread to an exhausted thread.

87. A winder having, in combination, a series of bobbin supports, a series of thread carriers to carry the ends of threads extending from bobbins on said supports, and means for moving said supports and carriers, the thread carriers moving faster than the bobbin supports to keep said threads taut.

88. In a winder, in combination, means for winding a plurality of threads; a thread-uniting means arranged to travel in proximity to said threads, and to be actuated upon the stoppage of the travel of said thread-uniting means; and means for stopping the travel of said thread-uniting means upon the exhausting of a thread being wound.

89. In a winder, in combination, means for winding a plurality of threads; a thread-uniting mechanism arranged to travel in proximity to said threads; and means for stopping the travel of said mechanism in position to operate upon one of the threads being wound, and for actuating said mechanism, upon the exhausting of said thread.

90. In a textile machine, in combination, a carriage; means for moving said carriage; a thread-uniting mechanism releasably connected with said carriage and arranged to be actuated upon its separation therefrom; and means for disconnecting said mechanism from said carriage.

91. In a winder, in combination, means for winding a thread; a carriage; means for moving said carriage; a thread-uniting mechanism releasably connected with said carriage and arranged to be actuated upon its separation therefrom; and means for disconnecting said mechanism from said carriage upon the exhausting of the thread being wound.

92. In a winder, in combination, means for winding a thread; means for uniting a thread to the other thread; and means controlling the operation of the uniting means, said controlling means being actuated by the drag of the thread being wound.

93. In a winder, in combination, means for winding a thread; a thread-uniting means; and means for actuating said thread-uniting means comprising a detector adapted to be moved by a broken or exhausted thread.

94. In a winder, in combination, means for winding a plurality of threads; a thread-uniting means arranged to travel in proximity to said threads, and to be actuated upon the stoppage of the travel of said thread-uniting means; and a detector adapted to be moved by an exhausted thread into the path of movement of said uniting means to stop its travel.

95. In a winder, in combination, means for winding a thread; a carriage; means for moving said carriage; a thread-uniting mechanism releasably connected with said carriage and arranged to be actuated upon its separation therefrom; and a detector adapted to be moved by an exhausted thread into the path of said thread-uniting mechanism to stop its travel.

96. The combination of a knot-tying mechanism mounted for reciprocation; a reciprocatory member; means for connecting said mechanism to said member so as to cause said mechanism to reciprocate with said member; means for disconnecting said mechanism from said member; and means actuated by such separation for actuating the knot-tying mechanism.

97. In a winder, in combination, means for winding a thread; means for detecting the exhausting of said thread; and pneumatic means for moving an exhausted thread into operative engagement with said detector means.

98. In a winder, in combination, means for winding a thread; means for joining a second thread to said thread upon the exhausting of the latter; means for detecting the exhausting of a thread; and pneumatic means for moving an exhausted thread into operative engagement with said detector means.

99. In a winder, in combination, means for winding a thread; means for joining another thread to said thread upon the exhausting of the latter; means for detecting the exhausting of a thread; and pneumatic means for moving an exhausted thread into operative engagement with said detector means, said detector means being arranged to actuate said thread-joining means.

100. In a winder, in combination, means for holding a thread; means for winding the thread; means for detecting the exhausting of said thread; and a suction tube having an opening adjacent to the thread at a point between the holding means and the winding means, for moving the thread when exhausted into operative engagement with said detector means.

101. In a winder, in combination, a movable support for a plurality of threads; a mechanism for winding one of said threads; means for joining another of said threads to the thread being wound upon the exhausting of the latter; and means for carrying a thread from said support to said thread-joining means.

102. In a winder, in combination, a movable support for a plurality of threads; a mechanism for winding one of said threads; means for joining another of said threads to the thread being wound upon the exhausting of the latter; and a movable chain having means for engaging a thread, for carrying it from said support to said thread-joining means.

103. In a textile machine, in combination, means for winding a plurality of threads; a thread-joining mechanism arranged to travel into position to tie a thread to any of the threads being wound; means for carrying the end of a thread to the path of movement of said thread-joining mechanism; and means for transferring the thread from said thread-carrying means to said thread-joining mechanism.

104. In a textile machine, in combination, a thread-joining mechanism arranged to travel and to carry a thread; means for carrying the end of a thread to the path of movement of said thread-joining mechanism; means for transferring the thread from said thread-carrying means to said thread-joining mechanism, which transferring means is arranged to be actuated when no thread is present at the thread-joining mechanism.

105. In a textile machine, in combination, a thread-joining means; means for supporting a thread at said thread-joining means; and means for carrying a thread to said thread-joining means, which thread-carrying means is arranged to be actuated when no thread is present at the thread-joining means.

106. In a textile machine, in combination, an endless thread chain; means for moving said chain; and two relatively movable members adapted to lie in contact with a thread, one of said members being adapted to actuate the means for moving said chain when no thread lies between said members.

107. In a textile machine, in combination, an endless thread chain; means for moving said chain; two relatively movable members adapted to lie in contact with a thread; a movable carriage; a slide on said carriage adapted to actuate said chain moving means; and means operated by one of said relatively movable members for fixing said slide with relation to said carriage to cause said slide to operate said chain-moving means.

108. In a knot-tying mechanism, in combination, knot-tying devices, a fork having a driving connection with said devices, and a stud coöperating with said fork to cause movement of the latter.

109. In a winder, means for supporting an active thread, means for supporting a reserve thread, a knotter for uniting said threads and trimming off the waste ends, suction means for carrying off the waste end of the first mentioned thread trimmed off by the knotter, and a separate suction means for carrying off the waste end of the reserve thread.

110. A winder having, in combination, a carrier, a thread clamp mounted on said carrier, said clamp comprising a plurality of jaws, one of said jaws having an extension: a spring tending to close said clamp; and means arranged to engage said extension to open the clamp.

In testimony whereof I affix my signature in presence of two witnesses.

HOWARD D. COLMAN.

Witnesses:
JOHN F. ELWOOD,
LOUISE A. CULVER.

It is hereby certified that in Letters Patent No. 1,184,077, granted May 23, 1916, upon the application of Howard D. Colman, of Rockford, Illinois, for an improvement in "Winders," errors appear in the printed specification requiring correction as follows: Page 2, line 24, for the word "traverse" read *transverse;* page 8, line 3, for the word "form" read *fork;* page 13, line 96, claim 30, for the word "inducting" read *inducing;* page 14, lines 47–48, claim 36, for the word "currents" read *current;* and that the said Letters Patent should be read with these corrections therein that the same may conform to the record of the case in the Patent Office.

Signed and sealed this 18th day of July, A. D., 1916.

[SEAL.]

R. F. WHITEHEAD,

*Acting Commissioner of Patents.*

Cl. 28—14.